(12) United States Patent
Tamai et al.

(10) Patent No.: US 8,389,630 B2
(45) Date of Patent: Mar. 5, 2013

(54) CURABLE COMPOSITION

(75) Inventors: Hitoshi Tamai, Settsu (JP); Kohei Ogawa, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 515 days.

(21) Appl. No.: 12/159,442

(22) PCT Filed: Dec. 27, 2006

(86) PCT No.: PCT/JP2006/326116
§ 371 (c)(1),
(2), (4) Date: Jun. 27, 2008

(87) PCT Pub. No.: WO2007/077888
PCT Pub. Date: Jul. 12, 2007

(65) Prior Publication Data
US 2010/0227949 A1 Sep. 9, 2010

(30) Foreign Application Priority Data
Dec. 28, 2005 (JP) .................................. 2005-380406

(51) Int. Cl.
| | |
|---|---|
| C08G 59/18 | (2006.01) |
| C08L 33/02 | (2006.01) |
| C08L 33/08 | (2006.01) |
| C08L 33/10 | (2006.01) |
| C08L 33/12 | (2006.01) |
| C08L 63/00 | (2006.01) |

(52) U.S. Cl. ........ 525/119; 525/107; 525/529; 525/530; 525/531; 525/533

(58) Field of Classification Search .................... 525/55, 525/107, 119, 523, 529, 530, 531, 533
See application file for complete search history.

(56) References Cited

U.S. PATENT DOCUMENTS

| | | | | |
|---|---|---|---|---|
| 4,129,713 A | * | 12/1978 | Skillicorn ...................... 560/205 |
| 4,478,963 A | * | 10/1984 | McGarry ....................... 523/205 |
| 6,555,622 B1 | * | 4/2003 | Kitano et al. ................. 525/107 |
| 6,943,219 B2 | * | 9/2005 | Kitano et al. ............... 525/330.3 |
| 7,196,141 B2 | * | 3/2007 | Kitano et al. ................. 525/276 |
| 2003/0130437 A1 | * | 7/2003 | Kitano et al. ............... 525/359.2 |
| 2003/0176576 A1 | * | 9/2003 | Fujita et al. .................... 525/107 |
| 2005/0148737 A1 | | 7/2005 | Nakagawa et al. |
| 2005/0272882 A1 | * | 12/2005 | Kitano et al. ................. 525/523 |
| 2007/0167583 A1 | | 7/2007 | Yano et al. |
| 2007/0265373 A1 | | 11/2007 | Bates et al. |

FOREIGN PATENT DOCUMENTS

| | | |
|---|---|---|
| EP | 0789036 A2 | 8/1997 |
| EP | 1002847 A1 | 5/2000 |
| EP | 1149869 A1 | 10/2001 |
| EP | 1616886 A1 | 1/2006 |
| EP | 1 666 536 A1 | 6/2006 |
| EP | 1731549 A1 | 12/2006 |
| GB | 1144638 A * | 3/1969 |
| JP | 3-221578 A | 9/1991 |
| JP | 4-72348 A | 3/1992 |
| JP | 8-217958 A | 8/1996 |
| JP | 8-283626 A | 10/1996 |
| JP | 9-310042 A | 12/1997 |
| JP | 10-45993 A | 2/1998 |
| JP | 11-80570 A | 3/1999 |
| JP | 11-130931 A | 5/1999 |
| JP | 11-349827 A | 12/1999 |
| JP | 2003-246861 A | 9/2003 |
| JP | 2004-285113 A | 10/2004 |
| JP | 2006-213843 A | 8/2006 |
| WO | 2005-023938 A1 | 3/2005 |

OTHER PUBLICATIONS

Machine translation of JP 2004-285113 A, provided by the JPO website (no date).*
European Search Report dated Mar. 4, 2009, issued in corresponding European Patent Application No. 06843498.4.
International Search Report of PCT/JP2006/326116, date of mailing Apr. 3, 2007.

* cited by examiner

*Primary Examiner* — Michael J Feely
(74) *Attorney, Agent, or Firm* — Westerman, Hattori, Daniels & Adrian, LLP

(57) ABSTRACT

Provided is a curable composition excellent in curability and mechanical properties as well as a cured product thereof. Specially provided is a curable composition containing a vinyl-based polymer (I) having one or more crosslinkable functional groups at a terminus on average and a nucleophilic agent (II) and a cured product obtained by curing the curable composition. Preferably, the curable composition of the invention further contains an epoxy resin (III).

14 Claims, No Drawings

CURABLE COMPOSITION

TECHNICAL FIELD

The present invention relates to a curable composition and a cured product obtained by curing the same. More specifically, the present invention relates to a curable composition containing a vinyl-based polymer (I) having one or more crosslinkable functional groups at a terminus on average and a nucleophilic agent (II).

BACKGROUND ART

When a (meth)acrylic polymer having a crosslinkable functional group, for example a polymer having a (meth)acryloyl group and a polymer having an alkenyl group are subjected to a crosslinking reaction in order to obtain rubber-like cured products, the former requires irradiation with an active energy ray such as UV, electron beam or heating after addition of a radical initiator (Non-patent Document 1) and the latter requires heating after addition of a hydrosilyl compound/hydrosilylation catalyst (Patent Document 1), because their curing at ordinary temperature is difficult. In applications to sealing materials, adhesives, FIPG (Formed In Place Gaskets) and the like where curing at ordinary temperature is required, polymers having crosslinkable silyl groups capable of curing with moisture at ordinary temperature are frequently mainly used (Patent Document 2). In the case of a polymer containing a hydrolysable silyl group, its crosslinking reaction is in the form of condensation reaction, so the resulting rubber-like cured product may undergo curing shrinkage (Patent Document 3), and when such a polymer is cured after being blended with another reactive resin represented by epoxy resin, there is a difference in the form of crosslinking reaction therebetween, thus bringing about problems such as deterioration in compatibility, insufficient expression of mechanical properties, and the like.

The polymer containing a hydrolysable silyl group is compounded with a curing catalyst such as an organometallic compound, particularly an organotin compound, and is thus also problematic from an environmental point of view (Patent Document 4).

A crosslinking reaction utilizing a Michael addition reaction of an amine compound to a carbon-carbon double bond is considered useful as a crosslinking reaction for solving the problem as described above.

For the crosslinking reaction utilizing Michael addition, there are proposed coating curable compositions with improvements in coating appearance and weather resistance, which contains a component having an α, β-unsaturated carboxylic acid, an active methylene group, and a Michael addition acceleration catalyst (Patent Document and Patent Document 6), an aqueous coating compositions with an improvement in weather resistance, which contains an acrylic polymer having an active methylene group in its molecule, an ethylenically unsaturated group and a Michael addition acceleration catalyst (Patent Document 7), and the like, but most of these prior techniques are related to application to coatings.

Up to now, there has been no report of an invention wherein the Michael addition reaction between a vinyl-based polymer having a double bond in its molecule, particularly at its molecular terminus, and an amine compound is utilized to give a rubber-like cured product excellent in oil resistance, heat resistance and weather resistance.

Patent Document 1: Japanese Patent Laying-Open No. 11-080570
Patent Document 2: Japanese Patent Laying-Open No. 11-130931
Patent Document 3: Japanese Patent Laying-Open No. 11-349827
Patent Document 4: Japanese Patent Laying-Open No. 2003-246861
Patent Document 5: Japanese Patent Laying-Open No. 8-283626
Patent Document 6: Japanese Patent Laying-Open No. 10-45993
Patent Document 7: Japanese Patent Laying-Open No. 9-310042
Non-patent Document 1: UV•EB Koka Zairyo (UV/EB Curable Material) supervised by Maiho Tabata and published on Dec. 28, 1992, by CMC Publishing CO., LTD.

DISCLOSURE OF THE INVENTION

Problems to be Solved by the Invention

An object of the present invention is to solve the problems described above. That is, an object of the present invention is to provide a curable composition which has excellent curability at ordinary temperature and is capable of giving a cured product excellent in heat resistance, oil resistance and weather resistance.

Another object of the present invention is to provide a curable composition based on a blend containing a vinyl-based polymer having a crosslinkable reactive group and a reactive epoxy resin or the like, which is capable of giving a cured product excellent in curability and a mechanical property-improving effect.

Means for Solving the Problems

In the light of the circumstances described above, the present inventors made extensive study, and as a result, they found that a curable composition containing a vinyl-based polymer having one or more crosslinkable functional groups at a terminus on average and a nucleophilic agent can be used to solve the problems described above, and the present invention was thereby completed.

That is, the present invention relates to a curable composition containing a vinyl-based polymer (I) having one or more crosslinkable functional groups at a terminus on average (hereinafter referred to sometimes as simply "vinyl-based polymer (I)") and a nucleophilic agent (II).

The nucleophilic agent (II) is preferably a compound having active hydrogen.

The compound having active hydrogen is preferably an amine compound and/or a thiol compound.

The amine compound is preferably at least one member selected from the group consisting of an aliphatic polyamine, an aromatic polyamine, an alicyclic polyamine, a polyamidoamine, and an imidazole, and the thiol compound is preferably at least one member selected from the group consisting of an aliphatic polythiol, an aromatic polythiol and a modified polythiol.

The curable composition of the present invention preferably further contains an epoxy resin (III).

The molecular-weight distribution of the vinyl-based polymer (I) is preferably less than 1.8.

The crosslinkable functional group of the vinyl-based polymer (I) is preferably a group having a polymerizable carbon-carbon double bond, an alkenyl group or an epoxy group.

The main chain of the vinyl-based polymer (I) is preferably a (meth)acrylic polymer, more preferably an acrylic polymer, particularly preferably an acrylate polymer.

The vinyl-based polymer (I) is preferably a polymer produced by controlled radical polymerization.

The controlled radical polymerization is preferably living radical polymerization, more preferably atom transfer radical polymerization. The atom transfer radical polymerization preferably uses, as a catalyst, a metal complex selected from transition metal catalysts composed of a VII, VIII, IX, X, or XI group element in the periodic table as a central metal, more preferably a metal complex selected from the group consisting of complexes of copper, nickel, ruthenium, or iron, particularly preferably a complex of copper.

The cured product of the preset invention is obtained by curing the curable composition as described above.

Effects of the Invention

According to the curable composition of the present invention, there can be provided a cured product having excellent ordinary-temperature curability, oil resistance, heat resistance, and weather resistance. When the vinyl-based polymer in the composition is cured as a blend with an epoxy resin, there can also be provided a cured product having excellent curability and improved mechanical properties.

BEST MODES FOR CARRYING OUT THE INVENTION

The curable composition of the present invention contains as components a vinyl-based polymer (I) having one or more crosslinkable functional groups at a terminus on average and a nucleophilic agent (II).

Hereinafter, the respective components contained in the curable composition of the present invention are described in detail.

<<Vinyl-Based Polymer (I)>>
<Main Chain>

Vinyl-based monomers constituting the main chain of the vinyl-based polymer (I) of the present invention are particularly not limited, and various one can be used. From the viewpoint of resistance such as weather resistance and heat resistance, acrylate-based monomers are preferable. Examples of such monomers include (meth)acrylic acid monomers such as (meth)acrylic acid, methyl(meth)acrylate, ethyl(meth)acrylate, n-propyl(meth)acrylate, isopropyl (meth)acrylate, n-butyl(meth)acrylate, isobutyl (meth)acrylate, tert-butyl(meth)acrylate, n-pentyl(meth)acrylate, n-hexyl(meth)acrylate, cyclohexyl(meth)acrylate, n-heptyl (meth)acrylate, n-octyl(meth)acrylate, 2-ethylhexyl (meth)acrylate, nonyl(meth)acrylate, decyl(meth)acrylate, dodecyl (meth)acrylate, phenyl(meth)acrylate, tolyl(meth)acrylate, benzyl(meth)acrylate, 2-methoxyethyl (meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, an ethylene oxide adduct of (meth)acrylic acid, trifluoromethylmethyl (meth)acrylate, 2-trifluoromethylethyl(meth)acrylate, perfluoroethylmethyl(meth)acrylate, 2-perfluoroethylethyl (meth)acrylate, perfluoroethylperfluorobutylmethyl(meth) acrylate, 2-perfluoroethyl-2-perfluorobutylethyl(meth) acrylate, perfluoroethyl(meth)acrylate, perfluoromethyl (meth)acrylate, diperfluoromethylmethyl(meth)acrylate, 2,2-diperfluoromethylethyl(meth)acrylate, perfluoromethylperfluaroethylmethyl (meth)acrylate, 2-perfluoromethyl-2-perfluaroethylethyl(meth)acrylate, 2-perfluorohexylmethyl(meth)acrylate, 2-perfluorohexylethyl(meth)acrylate, 2-perfluorodecylmethyl(meth)acrylate, 2-perfluorodecylethyl(meth)acrylate, 2-perfluorohexadecylmethyl(meth) acrylate and 2-perfluorohexadecylethyl(meth)acrylate. These compounds may be used alone, or at least two may be copolymerized. Herein, the term "(meth) acrylic acid" means acrylic acid and/or methacrylic acid.

For applications such as general building and construction, butyl acrylate monomers are further more preferred from the viewpoint that physical properties such as low viscosity of the curable composition, low modulus, high elongation, good weather resistance, and good heat resistance of cured products obtained therefrom are required. On the other hand, for applications such as automobiles where the oil resistance and the like are required, copolymers predominantly composed of ethyl acrylate are further more preferred. The polymer predominantly composed of ethyl acrylate is somewhat inferior in low-temperature characteristics (cold resistance), although it is excellent in oil resistance. Therefore, it is possible to substitute a part of ethyl acrylate units into butyl acrylate units for improving the low-temperature characteristics. However, since the good oil resistance is gradually deteriorated as a proportion of butyl acrylate increases, the proportion of butyl acrylate is preferably not more than 40 mol % (hereinafter also referred to simply as %), more preferably not more than 30 mol %, depending on the applications where the oil resistance is required. Furthermore, to improve low-temperature characteristics or the like without deteriorating oil resistance, it is also preferable that 2-methoxyethyl acrylate or 2-ethoxyethyl acrylate having oxygen introduced into an alkyl group in its side chain is used. However, when heat resistance is required, the ratio thereof is preferably not more than 40 mol %, since heat resistance tends to be poor by introduction of an alkoxy group having an ether bond in a side chain. A polymer suitable for various uses or required purposes can be obtained by changing the ratios of monomers in view of desired physical properties such as oil resistance, heat resistance and low-temperature characteristics. For example, as the polymer having well-balanced physical properties among oil resistance, heat resistance, low-temperature characteristics and the like, there may be mentioned, without limitation, a copolymer of ethyl acrylate/butyl acrylate/2-methoxyethyl acrylate (40 to 50/20 to 30/30 to 20, by molar ratio), among others.

The molecular weight distribution ratio of the vinyl-based polymer of the present invention, that is, the ratio (Mw/Mn) of the weight average molecular weight (Mw) to the number average molecular weight (Mn) as determined by gel permeation chromatography, is not particularly limited, but the ratio is preferably less than 1.8, more preferably 1.7 or less, still more preferably 1.6 or less, even more preferably 1.5 or less, further more preferably 1.4 or less, most preferably 1.3 or less. In GPC measurement in the present invention, a number average molecular weight and the like may be generally determined in terms of polystyrene using chloroform as a mobile phase and a polystyrene gel column for measurement.

The number-average molecular weight of the vinyl-based polymer in the present invention is not particularly limited, but is preferably in the range of 500 to 1,000,000, more preferably 1,000 to 100,000, still more preferably 5,000 to 50,000, as determined by gel permeation chromatography (GPC).

<Method of Synthesis of Main Chain>

The method of synthesizing the vinyl-based polymer in the present invention is particularly not limited, but preferably controlled radical polymerization is used. The controlled radical polymerization is not limited, but is preferably living radical polymerization, more preferably atom transfer radical polymerization. These polymerization techniques are described in the following.

(Controlled Radial Polymerization)

Radical polymerization processes are classified into a "general radical polymerization process" in which a monomer having a specific functional group and a vinyl-based monomer are simply copolymerized using an azo-based compound, a peroxide, or the like as a polymerization initiator, and a "controlled radial polymerization process" in which a specific functional group can be introduced into a controlled position such as a terminus or the like.

The "general radical polymerization process" is a simple process, and a monomer having a specific functional group can be introduced into a polymer only stochastically. When a polymer with high functionalization ratio is desired, therefore, a considerable amount of this monomer must be used. Conversely, use of a small amount of the monomer has the problem of increasing the ratio of a polymer into which the specific functional group is not introduced. There is also the problem of producing only a polymer with a wide molecular weight distribution and high viscosity because the process is free radical polymerization.

The "controlled radical polymerization process" is further classified into a "chain transfer agent process" in which polymerization is performed using a chain transfer agent having a specific functional group to produce a vinyl-based polymer having the functional group at a terminus, and a "living radical polymerization process" in which polymerization propagation termini propagate without causing termination reaction to produce a polymer having a molecular weight substantially as designed.

The "chain transfer agent process" is capable of producing a polymer with high functionalization ratio, but a considerable amount of a chain transfer agent having a specific functional group must be used relative to the initiator, thereby causing an economical problem of the cost including the treatment cost. Like the "general radical polymerization process", the chain transfer agent process also has the problem of producing only a polymer with a wide molecular weight distribution and high viscosity because it is free radical polymerization.

It is said that the "living radical polymerization process" belongs to radical polymerization which has a high polymerization rate and is difficult to control because termination reaction easily occurs due to radical coupling or the like. However, in the "living radical polymerization process" unlike the above-mentioned processes, termination reaction hardly occurs, a polymer having a narrow molecular weight distribution (Mw/Mn of about 1.1 to 1.5) can be produced, and the molecular weight can be freely controlled by changing the charge ratio of the monomer to the initiator.

Therefore, the "living radical polymerization process" is capable of producing a polymer with a narrow molecular weight distribution and low viscosity and introducing a monomer having a specific functional group into a substantially desired position of a polymer. Thus, this process is more preferred as a process for producing the vinyl-based polymer having the specific functional group.

In a narrow sense, "living polymerization" means polymerization in which molecular chains propagate while maintaining activity at the termini. However, the living polymerization generally includes pseudo-living polymerization in which molecular chains propagate in equilibrium between deactivated and activated termini. The definition in the present invention includes the latter.

In recent years, the "living radical polymerization process" has been actively studied by various groups. Examples of studies include a process using a cobalt porphyrin complex, as shown in Journal of American Chemical Society (J. Am. Chem. Soc.), 1994, vol. 116, p. 7943; a process using a radical scavenger such as a nitroxide compound, as shown in Macromolecules, 1994, vol. 27, p. 7228; and an atom transfer radical polymerization (ATRP) process using an organic halide or the like as an initiator and a transition metal complex as a catalyst.

Among these "living radical polymerization processes", the "atom transfer radical polymerization process" in which a vinyl-based monomer is polymerized using an organic halide or a halogenated sulfonyl compound as an initiator and a transition metal complex as a catalyst has the above-mentioned characteristics of the "living radical polymerization process" and also has the characteristic that a terminus has a halogen or the like, which is relatively useful for functional group conversion reaction, and the initiator and catalyst have high degrees of design freedom. Therefore, the atom transfer radical polymerization process is more preferred as a process for producing a vinyl-based polymer having a specific functional group. Examples of the atom transfer radical polymerization process include the processes disclosed in Matyjaszewski, et al., Journal of American Chemical Society (J. Am. Chem. Soc.), 1995, vol. 117, p. 5614; Macromolecules, 1995, vol. 28, p. 7901; Science, 1996, vol. 272, p. 866; WO96/30421, WO97/18247, WO98/01480 and WO98/40415; Sawamoto, et al., Macromolecules, 1995, vol. 28, p. 1721; and Japanese Patent Laying-Open No. 9-208616, Japanese Patent Laying-Open No. 8-41117.

In the present invention, any one of these processes may be used without limitation, but the atom transfer radical polymerization process is preferred.

Hereinafter, the living radical polymerization is described in detail, but before that, one of controlled radical polymerization processes that can be used in production of the vinyl-based polymer to be described later, that is, polymerization using a chain transfer agent is described. The radical polymerization process using the chain transfer agent (telomer) is not particularly limited, but examples of a process for producing a vinyl-based polymer having a terminal structure suitable for the present invention include the following two processes:

A process for producing a halogen-terminated polymer by using a halogenated hydrocarbon as the chain transfer agent as disclosed in Japanese Patent Laying-Open No. 4-132706, and a process for producing a hydroxyl group-terminated polymer using a hydroxyl group-containing mercaptan or a hydroxyl group-containing polysulfide or the like as the chain transfer agent as disclosed in Japanese Patent Laying-Open No. 61-271306, Japanese Patent No. 2594402, and Japanese Patent Laying-Open No. 54-47782.

Next, the living radical polymerization will be described.

First, the process using a nitroxide compound as the radical scavenger will be described. This polymerization process generally uses a stable nitroxy free radical (=N—O.) as a radical capping agent. Preferred examples of such a compound include, but are not limited to, nitroxy free radicals produced from cyclic hydroxyamines such as 2,2,6,6-substituted-1-piperidinyloxy radical and 2,2,5,5-substituted-1-pyrrolidinyloxy radical. As a substituent, an alkyl group having 4 or less carbon atoms such as a methyl group or an ethyl group is suitable. Specific examples of a nitroxy free radical compound include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1- piperidinyloxy radical, 2,2,5,5-tetramethyl-1-pyrrolidinyloxy radical, 1,1,3,3-tetramethyl-2-isoindolinyloxy radical, and N,N-di-tert-butylaminoxy radical. Instead of the nitroxy free radical, a stable free radical such as a galvinoxyl free radical may be used.

The radical capping agent is used in combination with a radical generator. The reaction product of the radical capping agent and the radical generator possibly serves as a polymerization initiator to promote polymerization of an addition-polymerizable monomer. The ratio between both agents used is not particularly limited, but the amount of the radical initiator is preferably 0.1 to 10 moles per mole of the radical capping agent.

As a radical generator, any one of various compounds can be used, but a peroxide capable of generating a radical under a polymerization temperature condition is preferred. Examples of the peroxide include, but are not limited to, diacyl peroxides such as benzoyl peroxide and lauroyl peroxide; dialkyl peroxides such as dicumyl peroxide and di-tert-butyl peroxide; peroxycarbonates such as diisopropyl peroxydicarbonate and bis(4-tert-butylcyclohexyl)peroxydicarbonate; and alkyl peresters such as tert-butyl peroxyoctoate and tert-butyl peroxybenzoate. In particular, benzoyl peroxide is preferred. Instead of the peroxide, a radical generator such as a radical generating azo compound, e.g., azobisisobutyronitrile, may be used.

As reported in Macromolecules, 1995, 28, p. 2993, the alkoxyamine compound shown below may be used as the initiator instead of a combination of the radical capping agent and the radical generator.

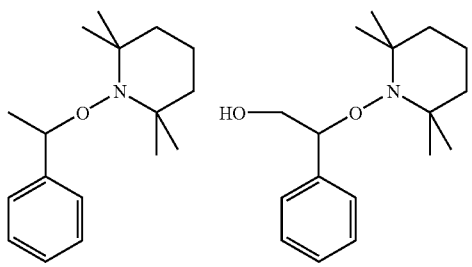

When the alkoxyamine compound is used as the initiator, the use of a compound having a functional group such as a hydroxyl group among those represented by the formula above produces a polymer having the functional group at a terminus. When this compound is used in the method of the present invention, a polymer having the functional group at a terminus is produced.

The conditions of polymerization using the nitroxide compound as the radical scavenger such as the conditions of the monomer, the solvent, and the polymerization temperature are not limited. However, these conditions may be the same as those in atom transfer radical polymerization which will be described in the following.

(Atom Transfer Radical Polymerization)

Next, the atom transfer radical polymerization process suitable as the living radical polymerization in the present invention will be described.

The atom transfer radical polymerization uses, as the initiator, an organic halide, particularly an organic halide having a highly reactive carbon-halogen bond (e.g., a carbonyl compound having a halogen at an α-position, or a compound having a halogen at a benzyl position), or a halogenated sulfonyl compound. Specific examples of such an initiator include:

$C_6H_5—CH_2X$,
$C_6H_5—C(H)(X)CH_3$,
$C_6H_5—C(X)(CH_3)_2$
(wherein $C_6H_5$ is a phenyl group, X is chlorine, bromine, or iodine);
$R^1—C(H)(X)—CO_2R^2$,
$R^1—C(CH_3)(X)—CO_2R^2$,
$R^1—C(H)(X)—C(O)R^2$,
$R^1—C(CH_3)(X)—C(O)R^2$
(wherein $R^1$ and $R^2$ are each a hydrogen atom or an alkyl, aryl, or aralkyl group having 1 to 20 carbon atoms, and X is chlorine, bromine, or iodine); and
$R^1—C_6H_4—SO_2X$
(wherein $R^1$ is a hydrogen atom or an alkyl, aryl, or aralkyl group having 1 to 20 carbon atoms, and X is chlorine, bromine, or iodine).

As the initiator of the atom transfer radical polymerization, an organic halide or a halogenated sulfonyl compound having a functional group other than a functional group which initiates polymerization can be used. In this case, the resultant vinyl-based polymer has the functional group at one of the main chain termini and a propagating terminal structure of the atom transfer radical polymerization at the other terminus. Examples of such a functional group include an alkenyl group, a crosslinkable silyl group, a hydroxyl group, an epoxy group, an amino group, an amide group and the like.

Examples of an organic halide having an alkenyl group include, but are not limited to, compounds having the structure represented by the general formula (1):

$$R^4R^5C(X)—R^6-R^7—C(R^3)=CH_2 \quad (1)$$

(wherein $R^3$ is hydrogen or a methyl group; $R^4$ and $R^5$ are each hydrogen, a monovalent alkyl, aryl or aralkyl group having 1 to 20 carbon atoms, or $R^4$ and $R^5$ are bonded together at the other termini; $R^6$ is —C(O)O— (an ester group), —C(O)— (a keto group), or an o-, m-, or p-phenylene group; $R^7$ is a direct bond or a divalent organic group having 1 to 20 carbon atoms, which may contain at least one ether bond; and X is chlorine, bromine, or iodine).

Specific examples of the substituents $R^4$ and $R^5$ include hydrogen, a methyl group, an ethyl group, an n-propyl group, an isopropyl group, a butyl group, a pentyl group, a hexyl group and the like. Substituents $R^4$ and $R^5$ may be bonded together at the other termini to form a cyclic skeleton.

Specific examples of an alkenyl group-containing organic halide represented by the general formula (1) include:
$XCH_2C(O)O(CH_2)_nCH=CH_2$,
$H_3CC(H)(X)C(O)O(CH_2)_nCH=CH_2$,
$(H_3C)_2C(X)C(O)O(CH_2)_nCH=CH_2$,
$CH_3CH_2C(H)(X)C(O)O(CH_2)_nCH=CH_2$,

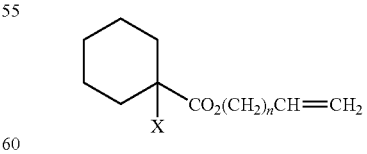

(wherein X is chlorine, bromine, or iodine, and n is an integer of 0 to 20);
$XCH_2C(O)O(CH_2)_nO(CH_2)_mCH=CH_2$,
$H_3CC(H)(X)C(O)O(CH_2)_nO(CH_2)_mCH=CH_2$,
$(H_3C)_2C(X)C(O)O(CH_2)_nO(CH_2)_mCH=CH_2$,
$CH_3CH_2C(H)(X)C(O)O(CH_2)_nO(CH_2)_mCH=CH_2$,

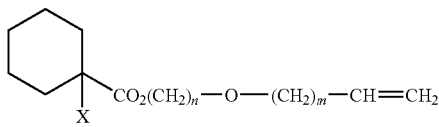

(wherein X is chlorine, bromine, or iodine, n is an integer of 1 to 20, and m is an integer of 0 to 20);
o, m, p-XCH$_2$—C$_6$H$_4$—(CH$_2$)$_n$—CH=CH$_2$,
o, m, p-CH$_3$C(H)(X)—C$_6$H$_4$—(CH$_2$)$_n$—CH=CH$_2$,
o, m, p-CH$_3$CH$_2$C(H)(X)—C$_6$H$_4$—(CH$_2$)$_n$—CH=CH$_2$
(wherein X is chlorine, bromine, or iodine, and n is an integer of 0 to 20);
o, m, p-XCH$_2$—C$_6$H$_4$—(CH$_2$)$_n$—O—(CH$_2$)$_m$—CH=CH$_2$,
o, m, p-CH$_3$C(H)(X)—C$_6$H$_4$—(CH$_2$)$_n$—O—(CH$_2$)$_m$—CH=CH$_2$,
o, m, p-CH$_3$CH$_2$C(H)(X)—C$_6$H$_4$—(CH$_2$)$_n$—O—(CH$_2$)$_m$—CH=CH$_2$
(wherein X is chlorine, bromine, or iodine, n is an integer of 1 to 20, and m is an integer of 0 to 20);
o, m, p-XCH$_2$—C$_6$H$_4$—O—(CH$_2$)$_n$—CH=CH$_2$,
o, m, p-CH$_3$C(H)(X)—C$_6$H$_4$—O—(CH$_2$)$_n$—CH=CH$_2$,
o, m, p-CH$_3$CH$_2$C(H)(X)—C$_6$H$_4$—O—(CH$_2$)$_n$—CH=CH$_2$
(wherein X is chlorine, bromine, or iodine, and n is an integer of 0 to 20); and
o, m, p-XCH$_2$—C$_6$H$_4$—O—(CH$_2$)$_n$—O—(CH$_2$)$_m$—CH=CH$_2$,
o, m, p-CH$_3$C(H)(X)C$_6$H$_4$—O—(CH$_2$)$_n$—O—(CH$_2$)$_m$—CH=CH$_2$,
o, m, p-CH$_3$CH$_2$C(H)(X)—C$_6$H$_4$—O—(CH$_2$)$_n$—O—(CH$_2$)$_m$—CH=CH$_2$
(wherein X is chlorine, bromine, or iodine, n is an integer of 1 to 20, and m is an integer of 0 to 20).

Other examples of an organic halide having an alkenyl group include compounds represented by the general formula (2):

$$H_2C=C(R^3)—R^7—C(R^4)(X)—R^8—R^5 \quad (2)$$

(wherein R$^3$, R$^4$, R$^5$, R$^6$, R$^7$, and X represent the same as the above, and R$^8$ represents a direct bond or —C(O)O— (an ester group), —C(O)— (a keto group), or an o-, m-, or p-phenylene group).

R$^7$ is a direct bond or a divalent organic group having 1 to 20 carbon atoms (which may contain at least one ether bond). When R$^7$ is a direct bond, the compound is a halogenated allyl compound in which a vinyl group is bonded to the carbon bonded to a halogen. In this case, the carbon-halogen bond is activated by the adjacent vinyl group, and thus a C(O)O or phenylene group is not necessarily required as R$^8$, and a direct bond may be present. When R$^7$ is not a direct bond, R$^8$ is preferably a —C(O)O—, —C(O)—, or phenylene group for activating the carbon-halogen bond.

Specific examples of the compounds represented by the general formula (2) include the following:
CH$_2$=CHCH$_2$X,
CH$_2$=C(CH$_3$)CH$_2$X,
CH$_2$=CHC(H)(X) CH$_3$,
CH$_2$=C(CH$_3$)C(H)(X) CH$_3$,
CH$_2$=CHC(X)(CH$_3$)$_2$,
CH$_2$=CHC(H)(X)C$_2$H$_5$,
CH$_2$=CHC(H)(X) CH(CH$_3$)$_2$,
CH$_2$=CHC(H)(X)C$_6$H$_5$,
CH$_2$=CHC(H)(X) CH$_2$C$_6$H$_5$,
CH$_2$=CHCH$_2$C(H)(X)—CO$_2$R,
CH$_2$=CH(CH$_2$)$_2$C(H)(X)—CO$_2$R,
CH$_2$=CH(CH$_2$)$_3$C(H)(X)—CO$_2$R,
CH$_2$=CH(CH$_2$)$_8$C(H)(X)—CO$_2$R,
CH$_2$=CHCH$_2$C(H)(X)—C$_6$H$_5$,
CH$_2$=CH(CH$_2$)$_2$C(H)(X)—C$_6$H$_5$,
CH$_2$=CH(CH$_2$)$_3$C(H)(X)—C$_6$H$_5$
(wherein X is chlorine, bromine, or iodine, and R is an alkyl, aryl, or aralkyl group having 1 to 20 carbon atoms).

Specific examples of a halogenated sulfonyl compound having an alkenyl group include the following:
o-, m-, p-CH$_2$=CH—(CH$_2$)$_n$—C$_6$H$_4$—SO$_2$X,
o-, m-, p-CH$_2$—CH$_2$=(CH$_2$)$_n$—O—C$_6$H$_4$—SO$_2$X
(wherein X is chlorine, bromine, or iodine, and n is an integer of 0 to 20).

Specific examples of an organic halide having a crosslinkable silyl group include, but are not limited to, compounds with a structure represented by the general formula (3):

$$R^4R^5C(X)—R^6\text{-}R^7—C(H)(R^3)CH_2—[Si(R^9)_{2-b}(Y)_b O]_m—Si(R^{10})_{3-a}(Y)_a \quad (3)$$

(wherein R$^3$, R$^4$, R$^5$, R$^6$, R$^7$, and X are as defined above, R$^9$ and R$^{10}$ each represent an alkyl, aryl, or aralkyl group having 1 to 20 carbon atoms, or a triorganosiloxy group represented by (R')$_3$SiO— (the three R's are each a monovalent hydrocarbon group having 1 to 20 carbon atoms and may be the same or different); when two or more groups R$^9$ or R$^{10}$ are present, they may be the same or different; Y represents a hydroxyl group or a hydrolysable group, and when two or more groups Y are present, they may be the same or different; a represents 0, 1, 2, or 3; b represents 0, 1, or 2; m represents an integer of 0 to 19; and a+mb≧1 is satisfied).

Specific examples of the compounds represented by the general formula (3) include the following:
XCH$_2$C(O)O(CH$_2$)$_n$Si(OCH$_3$)$_3$,
CH$_3$C(H)(X)C(O)O(CH$_2$)$_n$Si(OCH$_3$)$_3$,
(CH$_3$)$_2$C(X)C(O)O(CH$_2$)$_n$Si(OCH$_3$)$_3$,
XCH$_2$C(O)O(CH$_2$)$_n$Si(CH$_3$)(OCH$_3$)$_2$,
CH$_3$C(H)(X)C(O)O(CH$_2$)$_n$Si(CH$_3$)(OCH$_3$)$_2$,
(CH$_3$)$_2$C(X)C(O)O(CH$_2$)$_n$Si(CH$_3$)(OCH$_3$)$_2$
(wherein X is chlorine, bromine, or iodine, and n is an integer of 0 to 20);
XCH$_2$C(O)O(CH$_2$)$_n$O(CH$_2$)$_m$Si(OCH$_3$)$_3$,
H$_3$CC(H)(X)C(O)O(CH$_2$)$_n$O(CH$_2$)$_m$Si(OCH$_3$)$_3$,
(H$_3$C)$_2$C(X)C(O)O(CH$_2$)$_n$O(CH$_2$)$_m$Si(OCH$_3$)$_3$,
CH$_3$CH$_2$C(H)(X)C(O)O(CH$_2$)$_n$O(CH$_2$)$_m$Si(OCH$_3$)$_3$,
XCH$_2$C(O)O(CH$_2$)$_n$O(CH$_2$)$_m$Si(CH$_3$)(OCH$_3$)$_2$)
H$_3$CC(H)(X)C(O)O(CH$_2$)$_n$O(CH$_2$)$_m$—Si(CH$_3$)(OCH$_3$)$_2$,
(H$_3$C)$_2$C(X)C(O)O(CH$_2$)$_n$O(CH$_2$)$_m$—Si(CH$_3$)(OCH$_3$)$_2$,
CH$_3$CH$_2$C(H)(X)C(O)O(CH$_2$)$_n$O(CH$_2$)$_m$—Si(CH$_3$)(OCH$_3$)$_2$
(wherein X is chlorine, bromine, or iodine, n is an integer of 1 to 20, and m is an integer of 0 to 20); and
o, m, p-XCH$_2$—C$_6$H$_4$—(CH$_2$)$_2$Si(OCH$_3$)$_3$,
o, m, p-CH$_3$C(H)(X)—C$_6$H$_4$—(CH$_2$)$_2$Si(OCH$_3$)$_3$,
o, m, p-CH$_3$CH$_2$C(H)(X)—C$_6$H$_4$—(CH$_2$)$_2$Si(OCH$_3$)$_3$,
o, m, p-XCH$_2$—C$_6$H$_4$—(CH$_2$)$_3$Si(OCH$_3$)$_3$,
o, m, p-CH$_3$C(H)(X)—C$_6$H$_4$—(CH$_2$)$_3$Si(OCH$_3$)$_3$,
o, m, p-CH$_3$CH$_2$C(H)(X)—C$_6$H$_4$—(CH$_2$)$_3$Si(OCH$_3$)$_3$,
o, m, p-XCH$_2$—C$_6$H$_4$—(CH$_2$)$_2$—O—(CH$_2$)$_3$Si(OCH$_3$)$_3$,
o, m, p-CH$_3$C(H)(X)—C$_6$H$_4$—(CH$_2$)$_2$—O—(CH$_2$)$_3$Si(OCH$_3$)$_3$,
o, m, p-CH$_3$CH$_2$C(H)(X)—C$_6$H$_4$—(CH$_2$)$_2$—O—(CH$_2$)$_3$Si(OCH$_3$)$_3$,
o, m, p-XCH$_2$—C$_6$H$_4$—O—(CH$_2$)$_3$Si(OCH$_3$)$_3$,
o, m, p-CH$_3$C(H)(X)—C$_6$H$_4$—O—(CH$_2$)$_3$Si(OCH$_3$)$_3$,
o, m, p-CH$_3$CH$_2$C(H)(X)—C$_6$H$_4$—O—(CH$_2$)$_3$—Si(OCH$_3$)$_3$,
o, m, p-XCH$_2$—C$_6$H$_4$—O—(CH$_2$)$_2$—O—(CH$_2$)$_3$—Si(OCH$_3$)$_3$, o, m, p-CH$_3$C(H)(X)—C$_6$H$_4$—O—(CH$_2$)$_2$—O—(CH$_2$)$_3$Si(OCH$_3$)$_3$,
o, m, p-CH$_3$CH$_2$C(H)(X)—C$_6$H$_4$—O—(CH$_2$)$_2$—O—(CH$_2$)$_3$Si(OCH$_3$)$_3$
(wherein X is chlorine, bromine, or iodine).

Other examples of the organic halide having a crosslinkable silyl group include compounds with a structure represented by the general formula (4):

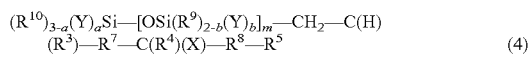
(4)

(wherein R$^3$, R$^4$, R$^5$, R$^7$, R$^8$, R$^9$, R$^{10}$, a, b, m, X and Y represent the same as the above).

Specific examples of such compounds include the following:
(CH$_3$O)$_3$SiCH$_2$CH$_2$C(H)(X)C$_6$H$_5$,
(CH$_3$O)$_2$(CH$_3$)SiCH$_2$CH$_2$C(H)(X)C$_6$H$_5$,
(CH$_3$O)$_3$Si(CH$_2$)$_2$C(H)(X)—CO$_2$R,
(CH$_3$O)$_2$(CH$_3$)Si(CH$_2$)$_2$C(H)(X)—CO$_2$R,
(CH$_3$O)$_3$Si(CH$_2$)$_3$C(H)(X)—CO$_2$R,
(CH$_3$O)$_2$(CH$_3$)Si(CH$_2$)$_3$C(H)(X)—CO$_2$R,
(CH$_3$O)$_3$Si(CH$_2$)$_4$C(H)(X)—CO$_2$R,
(CH$_3$O)$_2$(CH$_3$)Si(CH$_2$)$_4$C(H)(X)—CO$_2$R,
(CH$_3$O)$_3$Si(CH$_2$)$_9$C(H)(X)—CO$_2$R,
(CH$_3$O)$_2$(CH$_3$)Si(CH$_2$)$_9$C(H)(X)—CO$_2$R,
(CH$_3$O)$_3$Si(CH$_2$)$_3$C(H)(X)—C$_6$H$_5$,
(CH$_3$O)$_2$(CH$_3$)Si(CH$_2$)$_3$C(H)(X)—C$_6$H$_5$,
(CH$_3$O)$_3$Si(CH$_2$)$_4$C(H)(X)—C$_6$H$_5$,
(CH$_3$O)$_2$(CH$_3$)Si(CH$_2$)$_4$C(H)(X)—C$_6$H$_5$
(wherein X is chlorine, bromine, or iodine, and R is an alkyl, aryl, or aralkyl group having 1 to 20 carbon atoms).

Examples of the hydroxyl group-containing organic halide or halogenated sulfonyl compound include, but are not limited to, the following:
HO—(CH$_2$)$_n$—OC(O)C(H)(R)(X)
(wherein X is chlorine, bromine, or iodine, R is a hydrogen atom or an alkyl, aryl, or aralkyl group having 1 to 20 carbon atoms, and n is an integer of 1 to 20).

Examples of the amino group-containing organic halide or halogenated sulfonyl compound include, but are not limited to, the following:
H$_2$N—(CH$_2$)$_n$—OC(O)C(H)(R)(X)
(wherein X is chlorine, bromine, or iodine, R is a hydrogen atom or an alkyl, aryl, or aralkyl group having 1 to 20 carbon atoms, and n is an integer of 1 to 20).

Examples of the epoxy group-containing organic halide or halogenated sulfonyl compound include, but are not limited to, the following:

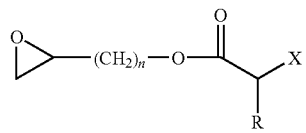

(wherein X is chlorine, bromine, or iodine, R is a hydrogen atom or an alkyl, aryl, or aralkyl group having 1 to 20 carbon atoms, and n is an integer of 1 to 20).

In order to obtain a polymer having at least two propagating terminal structures in the polymer per molecule, an organic halide or halogenated sulfonyl compound having at least two initiation points is preferably used as the initiator. Examples of such an initiator include the following:

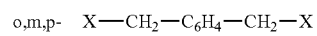
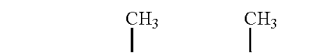
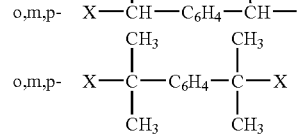

(wherein C$_6$H$_4$ is a phenylene group, and X is chlorine, bromine, or iodine);

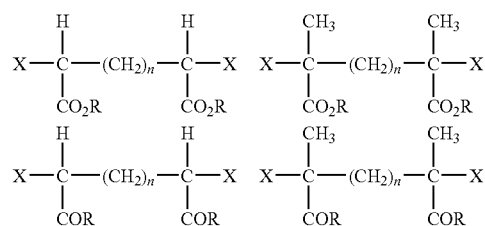

(wherein R is an alkyl, aryl, or aralkyl group having 1 to 20 carbon atoms, n is an integer of 0 to 20, and X is chlorine, bromine, or iodine);

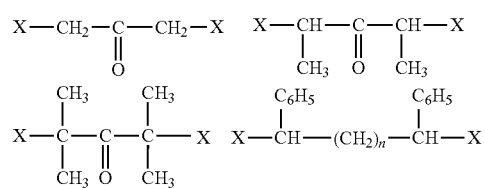

(wherein X is chlorine, bromine, or iodine, and n is an integer of 0 to 20);

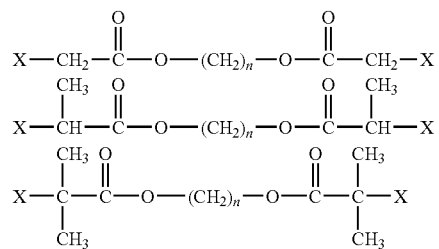

(wherein n is an integer of 1 to 20, and X is chlorine, bromine, or iodine); and

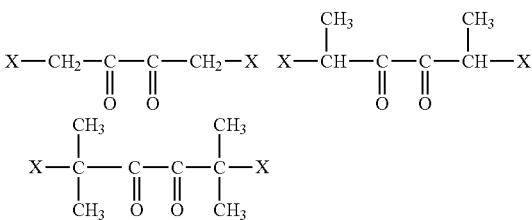

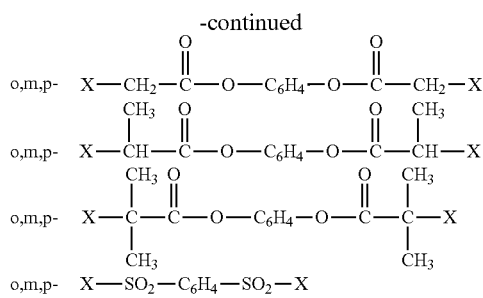

(wherein X is chlorine, bromine, or iodine).

The monomer used in the polymerization is not particularly limited, and any of the compounds listed above can be preferably used.

The transition metal complex used as the polymerization catalyst is not particularly limited, but a metal complex composed of a VII, VIII, IX, X, or XI group element in the periodic table as a central metal is preferred. A complex of zero-valent copper, monovalent copper, divalent ruthenium, divalent iron, or divalent nickel is more preferred. Among these complexes, a copper complex is preferred. Specific examples of a monovalent copper compound include cuprous chloride, cuprous bromide, cuprous iodide, cuprous cyanide, cuprous oxide, and cuprous perchlorate. When a copper compound is used, a ligand such as 2,2'-bipyridyl or its derivative, 1,10-phenanthroline or its derivative, or a polyamine, e.g., tetramethylethylenediamine, pentamethyldiethylenetriamine, or hexamethyl tris(2-aminoethyl)amine, can be added for increasing catalyst activity. As a ligand, nitrogen-containing compounds are preferred, chelate nitrogen-containing compounds are more preferred, and N,N,N',N'',N''-pentamethyldiethylenetriamine is further preferred. Also, a tristriphenylphosphine complex of divalent ruthenium chloride $(RuCl_2(PPh_3)_3)$ is suitable as the catalyst. When a ruthenium compound is used as the catalyst, an aluminum alkoxide is added as an activator. Furthermore, a bistriphenylphosphine complex of divalent iron $(FeCl_2(PPh_3)_2)$, a bistriphenylphosphine complex of divalent nickel $(NiCl_2(PPh_3)_2)$, or a bistributylphosphine complex of divalent nickel $(NiBr_2(PBu_3)_2)$ is preferred as the catalyst.

The polymerization can be performed without a solvent or in any of various solvents. Examples of the solvent include hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone, and methyl isobutyl ketone; alcohol solvents such as methanol, ethanol, propanol, isopropanol, n-butyl alcohol, and tert-butyl alcohol; nitrile solvents such as acetonitrile, propionitrile, and benzonitrile; ester solvents such as ethyl acetate and butyl acetate; and carbonate solvents such as ethylene carbonate and propylene carbonate. These solvents can be used alone or as a mixture of two or more.

The polymerization can be performed in the range of 0° C. to 200° C., and preferably 50° C. to 150° C., though this is not critical.

The atom transfer radical polymerization of the present invention includes so called reverse atom transfer radical polymerization. The reverse atom transfer radical polymerization is a process including reacting an ordinary atom transfer radical polymerization catalyst in its high oxidation state resulting from radical generation, for example Cu(II') when Cu(I) is used as the catalyst, with an ordinary radical initiator such as a peroxide, to thereby bring about an equilibrium state like in atom transfer radical polymerization (see Macromolecules, 1999, 32, 2872).

<Crosslinkable Functional Groups>
(Number of Crosslinkable Functional Groups)

From the viewpoint of the curability of the composition and the physical properties of the cured product, the vinyl-based polymer (I) has 1 or more, preferably 1.1 to 4.0 and more preferably 1.2 to 3.5 crosslinkable functional groups on average per molecule.

(Positions of Crosslinkable Functional Groups)

In cases where the cured products resulting from curing of the curable composition of the present invention are especially required to have rubber-like properties, it is preferred that at least one of crosslinkable functional groups be positioned at the terminus of the molecular chain so that the molecular weight between crosslinking sites, which has a great influence on the rubber elasticity, can be increased. More preferably, all crosslinkable functional groups are located at the molecular chain termini.

Processes of producing vinyl-based polymers having at least one crosslinkable functional group at the molecular terminus thereof are disclosed in JP-B 3-14068, JP-B 4-55444 and Japanese Patent Laying-Open No. 6-211922, among others. However, these processes are free radical polymerization processes in which the above-mentioned "chain transfer agent process" is used, and therefore, the polymers obtained generally have problems, namely they show a molecular weight distribution represented by Mw/Mn as broad as not less than 2 as well as a high viscosity, although they have crosslinkable functional groups, in relatively high proportions, at the molecular chain termini. Therefore, for obtaining vinyl-based polymers showing a narrow molecular weight distribution and a low viscosity and having crosslinkable functional groups, in high proportions, at the molecular chain termini, the above-described "living radical polymerization process" is preferably used.

The crosslinkable functional group of the vinyl-based polymer (I) includes, but is not limited to, a polymerizable carbon-carbon double bond, an alkenyl group and an epoxy group.

Hereinafter, these functional groups are described.

[Group Having a Polymerizable Carbon-Carbon Double Bond]

The group having a polymerizable carbon-carbon double bond is preferably a group represented by the general formula (5):

(wherein $R^9$ is hydrogen or a monovalent organic group having 1 to 20 carbon atoms), more preferably a group wherein $R^9$ is hydrogen or a methyl group.

In the general formula (5), specific examples of $R^9$ are not particularly limited, and include for example —H, —CH$_3$, —CH$_2$CH$_3$, —(CH$_2$)$_n$CH$_3$ (n represents an integer of 2 to 19), —C$_6$H$_5$, —CH$_2$OH, and —CN, among which —H and —CH$_3$ are preferred.

[Alkenyl Group]

The alkenyl group in the present invention is not limited, but is preferably one represented by the general formula (6):

(wherein $R^{10}$ represents a hydrogen atom or a hydrocarbon group having 1 to 20 carbon atoms).

In the general formula (6), $1V°$ is a hydrogen atom or a hydrocarbon group having 1 to 20 carbon atoms and is specifically exemplified by the following groups:

—$(CH_2)_n$—$CH_3$,
—$CH(CH_3)$—$(CH_2)_n$—$CH_3$,
—$CH(CH_2CH_3)$—$(CH_2)_n$—$CH_3$,
—$CH(CH_2CH_3)_2$,
—$C(CH_3)_2$—$(CH_2)_n$—$CH_3$,
—$C(CH_3)(CH_2CH_3)$—$(CH_2)_n$—$CH_3$,
—$C_6H_5$,
—$C_6H_5(CH_3)$,
—$C_6H_5(CH_3)_2$,
—$(CH_2)_n$—$C_6H_5$,
—$(CH_2)_n$—$C_6H_5(CH_3)$,
—$(CH_2)_n$—$C_6H_5(CH_3)_2$
(wherein n represents an integer of 0 or more, and the total number of carbon atoms in each group is 20 or less).

Among these groups, a hydrogen atom is preferred.

Preferably, the alkenyl group in the vinyl-based polymer (I) is not activated by a carbonyl group, an alkenyl group or an aromatic ring conjugated with the carbon-carbon double bond in the alkenyl group, although this is not a necessary condition.

The mode of bonding between the alkenyl group and the main chain of the polymer is not particularly limited, but both are preferably bound to each other via a bond such as a carbon-carbon bond, an ether bond, an ester bond, a carbonate bond, an amide bond or an urethane bond.

[Epoxy Group]

Preferable examples of the epoxy group include a glycidyl group, a glycidyl ether group, a 3,4-epoxycyclohexyl group and an oxetane group, among which a glycidyl group, a glycidyl ether group and a 3,4-epoxycyclohexyl group are more preferable from the viewpoint of reactivity.

<Crosslinkable Functional Group Introduction Method>

In the following, several methods of introducing a crosslinkable functional group into the vinyl-based polymer are described without any purpose of restriction.

The method of introducing the group having a polymerizable carbon-carbon double bond into the vinyl-based polymer is not limited, but the following methods can be mentioned.

(X-a) Method of replacing a halogen atom of the vinyl-based polymer by a compound having a radical-polymerizable carbon-carbon double bond to produce the objective polymer. A specific example is a method which includes reacting a vinyl-based polymer having a structure represented by the general formula (7) with a compound represented by the general formula (8).

—$CR^{11}R^{12}X$ (7)

(wherein $R^{11}$ and $R^{12}$ each represent a group bound to an ethylenically unsaturated group of a vinyl-based monomer, and X represents chlorine, bromine or iodine)

$M^+{}^-OC(O)C(R^9)$=$CH_2$ (8)

(wherein $R^9$ represents hydrogen or an organic group having 1 to 20 carbon atoms, and $M^+$ represents an alkali metal ion or a quaternary ammonium ion)

(X-b) Method of reacting a vinyl-based polymer having a hydroxyl group with a compound represented by the general formula (9):

$XC(O)C(R^9)$=$CH_2$ (9)

(wherein $R^9$ represents hydrogen or an organic group having 1 to 20 carbon atoms, and X represents chlorine, bromine, or a hydroxyl group).

(X-c) Method of reacting a vinyl-based polymer having a hydroxyl group with a diisocyanate compound and then reacting the residual isocyanate group with a compound represented by the general formula (10):

$HO$—$R^{13}$—$OC(O)C(R^9)$=$CH_2$ (10)

(wherein $R^9$ represents hydrogen or an organic group having 1 to 20 carbon atoms, and $R^{13}$ represents a divalent organic group having 2 to 20 carbon atoms).

Hereinafter, each of these methods is described in detail.

The method (X-a) above is described.

(X-a) Method which includes reacting a vinyl-based polymer having the terminal structure represented by the general formula (7) with a compound represented by the general formula (10);

—$CR^{11}R^{12}X$ (7)

(wherein $R^{11}$ and $R^{12}$ each represent a group bonded to an ethylenically unsaturated group of a vinyl-based monomer, and X represents chlorine, bromine, or iodine)

$M^+{}^-OC(O)C(R^9)$=$CH_2$ (8)

(wherein $R^9$ represents hydrogen or an organic group having 1 to 20 carbon atoms, and $M^+$ represents an alkali metal ion or quaternary ammonium ion).

The vinyl-based polymer having the terminal structure represented by the general formula (7) can be produced by a process of polymerizing a vinyl-based monomer using the organic halide or halogenated sulfonyl compound as the initiator and the transition metal complex as the catalyst, or a process of polymerizing a vinyl-based monomer using a halogen compound as the chain transfer agent. However, the former process is preferred.

The compound represented by the general formula (8) is not particularly limited. Specific examples of $R^9$ include, for example, —H, —$CH_3$, —$CH_2CH_3$, —$(CH_2)_nCH_3$ (n represents an integer of 2 to 19), —$C_6H_5$, —$CH_2OH$, and —CN. Among these groups, —H and —$CH_3$ are preferred. $M^+$ is a counter cation of oxyanion, and the type of $M^+$ includes an alkali metal ion, specifically a lithium ion, a sodium ion, a potassium ion and a quaternary ammonium ion. Examples of the quaternary ammonium ion include tetramethylammonium ion, tetraethylammonium ion, tetrabenzylammonium ion, trimethyldodecylammonium ion, tetrabutylammonium ion, and dimethylpiperidiniuum ion, and preferably sodium ion or potassium ion. The oxyanion in the general formula (8) is preferably used in an amount of 1 to 5 equivalents, more preferably 1.0 to 1.2 equivalents, relative to the halogen group represented by the general formula (7). The solvent used for carrying out the reaction is not particularly limited, but a polar solvent is preferred because the reaction is nucleophilic substitution reaction. Examples of the solvent include tetrahydrofuran, dioxane, diethyl ether, acetone, dimethylsulfoxide, dimethylformamide, dimethylacetamide, hexamethylphosphoric triamide, and acetonitrile. The reaction temperature is not particularly limited, but it is generally 0 to 150° C. and more preferably room temperature to 100° C. for maintaining the polymerizable terminal group.

The method (X-b) above is described.

The method (X-b) includes reacting a vinyl-based polymer having a hydroxyl group with a compound represented by the general formula (9):

$XC(O)C(R^9)$=$CH_2$ (9)

(wherein $R^9$ represents hydrogen or an organic group having 1 to 20 carbon atoms, and X represents chlorine, bromine, or a hydroxyl group).

The compound represented by the general formula (9) is not particularly limited. Specific examples of $R^9$ include, for example, —H, —$CH_3$, —$CH_2CH_3$, —$(CH_2)_nCH_3$ (n represents an integer of 2 to 19), —$C_6H_5$, —$CH_2OH$, and —CN. Among these groups, —H and —$CH_3$ are preferred.

The vinyl-based polymer having a hydroxyl group, preferably at a terminus, can be produced by a process of polymerizing a vinyl-based monomer using the organic halide or halogenated sulfonyl compound as the initiator and the transition metal complex as the catalyst, or a process of polymerizing a vinyl-based monomer using a hydroxyl group-containing compound as the chain transfer agent. However, the former process is preferred. The process for producing the vinyl-based polymer having a hydroxyl group is not particularly limited, but examples of the process include the following:

(a) A process of reacting a second monomer such as a compound having both a polymerizable alkenyl group and a hydroxyl group in its molecule represented by the general formula (11) below in living radical polymerization for synthesizing a vinyl-based polymer;

$$H_2C=C(R^{14})-R^{15}-R^{16}-OH \quad (11)$$

(wherein $R^{14}$ represents an organic group having 1 to 20 carbon atoms, preferably hydrogen or a methyl group, and may be the same or different, $R^{15}$ represents —C(O)O— (an ester group) or an o-, m-, or p-phenylene group, and $R^{16}$ represents a direct bond or a divalent organic group having 1 to 20 carbon atoms, which may contain at least one ether bond; the compound having an ester group as $R^{15}$ is a (meth) acrylate compound, and the compound having a phenylene group as $R^{15}$ is a styrene-based compound).

The time to react the compound having both a polymerizable alkenyl group and a hydroxyl group in its molecule is not particularly limited. However, particularly when rubber-like properties are expected, the second monomer is preferably reacted at the final stage of polymerization reaction or after the completion of reaction of the employed monomers.

(b) A process of reacting a second monomer such as a compound having both a low-polymerizable alkenyl group and a hydroxyl group in its molecule at the final stage of polymerization reaction or after the completion of reaction of the employed monomers in living radical polymerization for synthesizing a vinyl-based polymer.

The compound includes, but is not limited to, compounds represented by the general formula (12):

$$H_2C=C(R^{14})-R^{17}-OH \quad (12)$$

(wherein $R^{14}$ represents the same as the above, and $R^{17}$ represents a divalent organic group having 1 to 20 carbon atoms, which may contain at least one ether bond).

The compound represented by the general formula (12) is not particularly limited, but an alkenyl alcohol such as 10-undecenol, 5-hexenol, or allyl alcohol is preferred from the viewpoint of easy availability.

(c) A process of introducing a terminal hydroxyl group by hydrolysis or by reacting a hydroxyl group-containing compound with a halogen of a vinyl-based polymer having at least one carbon-halogen bond represented by the general formula (7), which is produced by atom transfer radical polymerization, as disclosed in Japanese Patent Laying-Open No. 4-132706.

(d) A process of substituting a halogen by reacting a vinyl-based polymer having at least one carbon-halogen bond represented by the general formula (7) and produced by atom transfer radical polymerization with a stabilized carbanion represented by the general formula (13) having a hydroxyl group;

$$M^+C^-(R^{18})(R^{19})-R^{17}-OH \quad (13)$$

(wherein $R^{17}$ represents the same as the above, and $R^8$ and $R^{19}$ each represent an electron-withdrawing group capable of stabilizing carbanion $C^-$ or one of $R^{18}$ and $R^{19}$ represents an electron-withdrawing group, the other representing hydrogen or an alkyl or phenyl group having 1 to 10 carbon atoms). Examples of the electron-withdrawing group as $R^{18}$ and $R^{19}$ include —$CO_2R$ (an ester group), —C(O)R (a keto group), —$CON(R_2)$ (an amide group), —COSR (a thioester group), —CN (a nitrile group), and —$NO_2$ (a nitro group). Substituent R is an alkyl group having 1 to 20 carbon atoms, an aryl group having 6 to 20 carbon atoms, or an aralkyl group having 7 to 20 carbon atoms, and preferably an alkyl or phenyl group having 1 to 10 carbon atoms. In particular, —$CO_2R$, —C(O)R, and —CN are preferred as $R^{18}$ and $R^{19}$.

(e) A process of reacting a vinyl-based polymer having at least one carbon-halogen bond represented by the general formula (7) and produced by atom transfer radical polymerization with a simple substance metal such as zinc, or an organometallic compound to prepare an enolate anion, and then reacting the anion with an aldehyde or ketone.

(f) A process of reacting a polymer having at least one terminal halogen, preferably a vinyl-based polymer having at least one halogen represented by the general formula (7), with a hydroxyl group-containing oxyanion represented by the general formula (14) or a hydroxyl group-containing carboxylate anion represented by the general formula (15) to substitute the halogen with a hydroxyl group-containing substituent;

$$HO-R^{17}-O^-M^+ \quad (14)$$

(wherein $R^{17}$ and $M^+$ represent the same as the above)

$$HO-R^{17}-C(O)O^-M^+ \quad (15)$$

(wherein $R^{17}$ and $M^+$ represent the same as the above).

Among processes (a) and (b) for introducing a hydroxyl group without directly involving a halogen, process (b) is more preferred in the present invention, from the viewpoint of ease of control.

Among processes (c) to (0 for introducing a hydroxyl group by converting the halogen of the vinyl-based polymer having at least one carbon-halogen bond, process (0 is more preferred from the viewpoint of ease of control.

The method (X-c) is described.

The method (X-c) includes reacting a vinyl-based polymer having a hydroxyl group with a diisocyanate compound and then reacting the residual isocyanate group with a compound represented by the general formula (16):

$$HO-R^{13}-OC(O)C(R^9)=CH_2 \quad (16)$$

(wherein $R^9$ represents hydrogen or an organic group having 1 to 20 carbon atoms, and $R^{13}$ represents a divalent organic group having 2 to 20 carbon atoms).

The compound represented by the general formula (16) is not particularly limited, and specific examples of $R^9$ include —H, —$CH_3$, —$CH_2CH_3$, —$(CH_2)_nCH_3$ (n represents an integer of 2 to 19), —$C_6H_5$, —$CH_2OH$, and —CN. Among these groups, —H and —$CH_3$ are preferred. As the specific compound, 2-hydroxypropyl methacrylate is mentioned.

As the vinyl-based polymer having a hydroxyl group, the vinyl-based polymer obtained by the same method as described above can be used.

The diisocyanate compound is not particularly limited, and any known compounds can be used, and examples thereof include isocyanate compounds such as toluoylene diisocyanate, 4,4'-diphenylmethane diisocyanate, hexamethyl diisocyanate, xylylene diisocyanate, metaxylylene diisocyanate, 1,5-naphthalene diisocyanate, hydrogenated diphenylmethane diisocyanate, hydrogenated toluoylene diisocyanate, hydrogenated xylylene diisocyanate, and isophorone diisocyanate.

These compounds can be used alone or in combination of two or more. Also, a block isocyanate may be used.

In order to achieve higher weather resistance, a diisocyanate compound with no aromatic ring, such as hexamethylene diisocyanate or hydrogenated diphenylmethane diisocyanate, is preferably used.

The method of introducing an alkenyl group into the vinyl-based polymer is not limited, but the following methods can be mentioned.

(A-a) Method including subjecting, to reaction, a compound having, in each molecule, a polymerizable alkenyl group together with a low polymerizable alkenyl group, such as one represented by the general formula (17) shown below as a second monomer in synthesizing a vinyl-based polymer by radical polymerization:

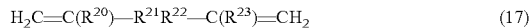

$$H_2C=C(R^{20})-R^{21}R^{22}-C(R^{23})=CH_2 \quad (17)$$

(wherein $R^{20}$ represents hydrogen or a methyl group, $R^{21}$ represents —C(O)O— or an o-, m- or p-phenylene group, $R^{22}$ represents a direct bond or a divalent organic group having 1 to 20 carbon atoms, which may contain one or more ether bonds, and $R^{23}$ represents hydrogen, an alkyl group having 1 to 20 carbon atoms, an aryl group having 6 to 20 carbon atoms or an aralkyl group having 7 to 20 carbon atoms).

The time when the compound having, in each molecule, a polymerizable alkenyl group together with a low polymerizable alkenyl group is subjected to reaction is not particularly limited, but particularly in living radical polymerization and when rubber-like properties are expected, the compound is preferably subjected to reaction as a second monomer at the final stage of the polymerization reaction or after completion of the reaction of the employed monomers.

(A-b) Method including subjecting, to reaction, a compound having at least two low polymerizable alkenyl groups, for example 1,5-hexadiene, 1,7-octadiene or 1,9-decadiene, at the final stage of the polymerization or after completion of the reaction of the monomers employed in vinyl-based polymer synthesis by living radical polymerization.

(A-c) Method including reacting a vinyl-based polymer having at least one highly reactive carbon-halogen bond with one of various alkenyl group-containing organometallic compounds, for example an organotin such as allyltributyltin or allyltrioctyltin, for substitution of the halogen.

(A-d) Method including reacting a vinyl-based polymer having at least one highly reactive carbon-halogen bond with a stabilized, alkenyl group-containing carbanion, such as one represented by the general formula (20), for substitution of the halogen:

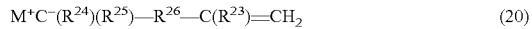

$$M^+C^-(R^{24})(R^{25})-R^{26}-C(R^{23})=CH_2 \quad (20)$$

(wherein $R^{23}$ is as defined above, $R^{24}$ and $R^{25}$ each is an electron-withdrawing group capable of stabilizing the carbanion $C^-$ or one of them is such an electron-withdrawing group and the other represents hydrogen, an alkyl group having 1 to 10 carbon atoms or a phenyl group, $R^{26}$ represents a direct bond or a divalent organic group containing 1 to 10 carbon atoms, which may contain one or more ether bonds, and $M^+$ represents an alkali metal ion or a quaternary ammonium ion).

Particularly preferred as the electron-withdrawing group $R^{24}$ and/or $R^{25}$ are those which have a structure of —CO$_2$R, —C(O)R or —CN.

(A-e) Method including reacting a vinyl-based polymer having at least one highly reactive carbon-halogen bond with a simple substance metal such as zinc, or an organometallic compound and then reacting the thus-prepared enolate anion with an alkenyl group-containing, electrophilic compound such as an alkenyl group-containing compound having a leaving group such as halogen or an acetyl group, an alkenyl group-containing carbonyl compound, an alkenyl group-containing isocyanate compound or an alkenyl group-containing acid halide.

(A-f) Method including reacting a vinyl-based polymer having at least one highly reactive carbon-halogen bond with an alkenyl group-containing oxyanion or carboxylate anion, such as one represented by the general formula (21) or (22), for substitution of the halogen:

$$H_2C=C(R^{23})-R^{27}-O^-M^+ \quad (21)$$

(wherein $R^{23}$ and $M^+$ are as defined above and $R^{27}$ is a divalent organic group having 1 to 20 carbon atoms, which may contain one or more ether bonds);

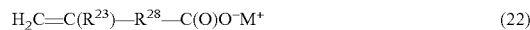

$$H_2C=C(R^{23})-R^{28}-C(O)O^-M^+ \quad (22)$$

(wherein $R^{23}$ and $M^+$ are as defined above and $R^{28}$ is a direct bond or a divalent organic group having 1 to 20 carbon atoms, which may contain one or more ether bonds).

The method of synthesizing the above-mentioned vinyl-based polymer having at least one highly reactive carbon-halogen bond includes, but is not limited to, atom transfer radical polymerization processes using an organic halide or the like as an initiator and a transition metal complex as a catalyst, as mentioned above.

It is also possible to obtain the vinyl-based polymer having at least one alkenyl group from a vinyl-based polymer having at least one hydroxyl group. As utilizable methods, there may be mentioned, for example, the following, without any purpose of restriction.

(A-g) Method including reacting the hydroxyl group of a vinyl-based polymer having at least one hydroxyl group with a base such as sodium methoxide, followed by reaction with an alkenyl group-containing halide such as allyl chloride.

(A-h) Method including reacting such hydroxyl group with an alkenyl group-containing isocyanate compound such as allyl isocyanate.

(A-i) Method including reacting such hydroxyl group with an alkenyl group-containing acid halide such as (meth)acrylic acid chloride, in the presence of a base such as pyridine.

(A-j) Method including reacting such hydroxyl group with an alkenyl group-containing carboxylic acid such as acrylic acid, in the presence of an acid catalyst.

In the present invention, when no halogen is directly involved in the alkenyl group introduction such as in the method (A-a) or (A-b), the vinyl-based polymer is preferably synthesized by living radical polymerization. From the viewpoint of ready controllability, the method (A-b) is more preferred.

In cases where alkenyl group introduction is effected by conversion of the halogen of a vinyl-based polymer having at least one highly reactive carbon-halogen bond, use is preferably made of a vinyl-based polymer having at least one highly reactive terminal carbon-halogen bond as obtained by subjecting a vinyl-based monomer to radical polymerization (atom transfer radical polymerization) using, as an initiator, an organic halide or halogenated sulfonyl compound having at least one highly reactive carbon-halogen bond, and as a catalyst, a transition metal complex. In view of easier controllability, the method (A-f) is more preferred.

Method (B) of producing the vinyl-based polymer having at least one hydroxyl group, which is used in the methods (A-g) to (A-j) includes, but is not limited to, the following:
(B-a) Method including subjecting to reaction, as a second monomer, a compound having both a polymerizable alkenyl group and a hydroxyl group in each molecule, for example one represented by the general formula (23) given below, in synthesizing the vinyl-based polymer by radical polymerization:

$$H_2C=C(R^{20})-R^{21}-R^{22}-OH \quad (23)$$

(wherein $R^{20}$, $R^{21}$ and $R^{22}$ are as defined above).

The time for subjecting to reaction the compound having both a polymerizable alkenyl group and a hydroxyl group in each molecule is not limited, but particularly in living radical polymerization and when rubber-like properties are demanded, the compound is preferably subjected to reaction as a second monomer at the final stage of the polymerization reaction or after completion of the reaction of the employed monomer.

(B-b) Method including subjecting an alkenyl alcohol such as 10-undecenol, 5-hexenol or allyl alcohol, to reaction at the final stage of polymerization reaction or after completion of the reaction of the employed monomer in synthesizing the vinyl-based polymer by living radical polymerization.

(B-c) Method including radical-polymerizing a vinyl-based monomer using a hydroxyl group-containing chain transfer agent such as a hydroxyl group-containing polysulfide, in large amounts, as described in Japanese Patent Laying-Open No. 5-262808, for instance.

(B-d) Method including subjecting a vinyl-based monomer to radical polymerization using hydrogen peroxide or a hydroxyl group-containing initiator, as described in Japanese Patent Laying-Open No. 6-239912 and Japanese Patent Laying-Open No. 8-283310, for instance.

(B-e) Method including subjecting a vinyl-based monomer to radical polymerization using an alcohol in excess, as described in Japanese Patent Laying-Open No. 6-116312, for instance.

(B-f) Method including introducing a terminal hydroxyl group by hydrolyzing the halogen of a vinyl-based polymer having at least one highly reactive carbon-halogen bond or reacting such halogen with a hydroxyl group-containing compound, according to the method described in Japanese Patent Laying-Open No. 4-132706, for instance.

(B-g) Method including reacting a vinyl-based polymer having at least one highly reactive carbon-halogen bond with a hydroxyl group-containing stabilized carbanion such as one represented by the general formula (24) for substitution of the halogen:

$$M^+C^-(R^{24})(R^{25})-R^{26}-OH \quad (24)$$

(wherein $R^{24}$, $R^{25}$ and $R^{26}$ are as defined above).

Particularly preferred as the electron-withdrawing groups $R^{24}$ and $R^{25}$ are those having a structure of —$CO_2R$, —$C(O)R$ or —CN.

(B-h) Method including reacting a vinyl-based polymer having at least one highly reactive carbon-halogen bond with a simple substance metal such as zinc, or an organometallic compound and then reacting the resultant enolate anion with an aldehyde or ketone.

(B-i) Method including reacting a vinyl-based polymer having at least one highly reactive carbon-halogen bond with a hydroxyl group-containing oxyanion or carboxylate anion such as one represented by the general formula (25) or (26) given below, for substitution of the halogen:

$$HO-R^{27}-O^-M^+ \quad (25)$$

(wherein $R^{27}$ and NC are as defined above);

$$HO-R^{28}-C(O)O^-M^+ \quad (26)$$

(wherein $R^{28}$ and $M^+$ are as defined above).

(B-j) Method including subjecting, as a second monomer, a compound having a low polymerizable alkenyl group and a hydroxyl group in each molecule to reaction at the final stage of the polymerization reaction or after completion of the reaction of the employed monomer in synthesizing the vinyl-based polymer by living radical polymerization.

Such compound includes, but is not limited to, compounds represented by the general formula (27):

$$H_2C=C(R^{20})-R^{27}-OH \quad (27)$$

(wherein $R^{20}$ and $R^{27}$ are as defined above).

The compound represented by the above general formula (27) is not particularly limited, but in view of ready availability, alkenyl alcohols such as 10-undecenol, 5-hexenol and allyl alcohol are preferred.

In the present invention, when no halogen is directly involved in hydroxyl group introduction such as in the methods (B-a) to (B-e) and (B-j), the vinyl-based polymer is preferably synthesized by living radical polymerization. The method (B-b) is more preferred from the viewpoint of ease of control.

In cases where hydroxyl group introduction is effected by conversion of the halogen of a vinyl-based polymer having at least one highly reactive carbon-halogen bond, use is preferably made of a vinyl-based polymer having at least one highly reactive terminal carbon-halogen bond as obtained by subjecting a vinyl-based monomer to radical polymerization (atom transfer radical polymerization) using an organic halide or halogenated sulfonyl compound as an initiator and, as a catalyst, a transition metal complex. From the viewpoint of ease of control, the method (B-i) is more preferred.

Hereinafter, the method of introducing an epoxy group is described.

The method of producing the vinyl-based polymer having an epoxy group at the terminus thereof used in the present invention is not limited, but includes the following steps:

(1) a step of subjecting vinyl-based monomers to living radical polymerization to produce a Br-terminated vinyl-based polymer, and (2) a step of converting the Br-terminus of the polymer into a substituent having a reactive functional group.

After the reaction, the reactive functional group of the polymer is substituted with a halogen-containing epoxy compound, whereby an epoxy group can be introduced into the terminus of the polymer.

The method of converting the terminus of the polymer includes, for example, a nucleophilic substitution reaction using a nucleophilic agent having a reactive functional group. Examples of such nucleophilic agent includes, for example, alcohol compounds, phenol compounds, carboxylic acid compounds, amine compounds and amide compounds each having a reactive functional group, and alkali metal salts or ammonium salts thereof. Carbanions having a reactive functional group and stabilized by an electron-withdrawing substituent can also be preferably used.

The amine having a reactive functional group includes, for example, an amine having a hydroxyl group, such as ethanolamine. Alkali metal salts and ammonium salts of the above-mentioned various nucleophilic agents may also be used as nucleophilic agents. The alkali metal salts and ammonium salts are obtained by reacting the above nucleophilic agents with a basic compound.

A vinyl-based polymer having a reactive functional group at both termini can also be produced by polymerizing vinyl-based monomers using an initiator having a reactive functional group, followed by coupling of a polymer terminus with one another. The method of coupling includes, for example, a method which includes coupling terminal halogens with each other using a compound having a total of two or more functional groups which may be the same or different, each functional group being capable of substituting the terminal halogen. The vinyl-based polymer having a reactive functional group at both termini obtained by the coupling method is reacted with a halogen-containing epoxy compound to replace the reactive functional group by the compound, whereby a vinyl-based polymer having an epoxy group introduced into each of both termini can be produced.

A vinyl-based polymer having a reactive functional group at a terminus of the main chain thereof can be produced by radical polymerization of vinyl-based monomers by using a chain transfer agent having a reactive functional group.

There is another method which includes reacting allyl alcohol at the final stage of atom transfer radical polymerization and then forming an epoxy ring with a hydroxyl group and a halogen group.

<<Nucleophilic Agent (II)>>

The nucleophilic agent (II) contained in the curable composition of the present invention forms a crosslinked structure through Michael addition reaction with the crosslinkable functional group of the vinyl-based polymer (I). The cured product thus obtained is excellent in rubber elasticity maintaining excellent physical properties derived from the vinyl-based polymer (I), such as oil resistance, heat resistance, and weather resistance. The nucleophilic agent (II) can include active hydrogen-containing compounds. The active hydrogen-containing compounds are not particularly limited, but are preferably amine compounds and thiol compounds from the viewpoint of reactivity with the vinyl-based polymer (I). From the viewpoint of reactivity, the active hydrogen-containing compounds are more preferably polyamines, polyamide compounds and polythiol compounds.

<Amine Compound>

As the amine compound that is the nucleophilic agent (II), conventionally known ones may be widely used. Examples are aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine, tetramethylguanidine and oleylamine; alicyclic amines such as menthendiamine, isophoronediamine, norbornanediamine, piperidine, N,N'-dimethylpiperazine, N-aminoethylpiperazine, Lamiron C-260 manufactured by BASF Corp., Araldit HY-964 manufactured by Ciba, menthenediamine manufactured by Rohm & Haas Corporation, 1,2-diaminocyclohexane, diaminodicyclohexylmethane, bis(4-amino-3-methylcyclohexyl)methane, bis(4-aminocyclohexyl)methane, polycyclohexylpolyamine and 1,8-diazabicyclo[5,4,0]undecane-7 (DBU); aromatic amines such as m-xylylenediamine, m-phenylenediamine, 4,4'-diaminodiphenylmethane and 4,4'-diaminodiphenylsulfone; linear diamines represented by the formula: $(CH_3)_2N(CH_2)_nN(CH_3)_2$ (wherein n represents an integer of 1 to 10), linear tertiary amines represented by the formula: $(CH_3)_2$—$N(CH_2)_n$—$CH_3$ (wherein n represents an integer of 0 to 10), and alkyl tertiary monoamines represented by the formula: $N\{(CH_2)_nCH_3\}_3$ (wherein n represents an integer of 1 to 10); aliphatic aromatic amines such as benzyldimethylamine, 2-(dimethylaminomethyl)phenol and 2,4,6-tris(dimethylaminomethyl)phenol; amines having ether bonds such as 3,9-bis(3-aminopropyl)-2,4,8,10-tetraoxaspiro[5,5]undecane (ATU), morpholine, N-methylmorpholine, polyoxypropylenediamine, polyoxypropylenetriamine and polyoxyethylenediamine; hydroxyl group-containing amines such as diethanolamine and triethanolamine; triethylenediamine, pyridine, picoline, and diazacycloundecene, acid anhydrides such as phthalic anhydride, trimellitic anhydride, pyromellitic anhydride, benzophenonetetracarboxylic anhydride, tetrahydrophthalic anhydride, methyltetrahydrophthalic anhydride, methylnadic anhydride, hexahydrophthalic anhydride, and dodecylsuccinic anhydride; polyamides and various kinds of polyamide resins obtained by reaction of a polyamine such as diethylenetriamine and triethylenetetramine with a dimer acid; polyamidoamines such as polyamides using a polycarboxylic acid other than dimer acids; various kinds of imidazoles such as 2-ethyl-4-methylimidazole; dicyanodiamides and derivatives thereof, polyoxypropylene amines such as polyoxypropylene diamines and polyoxypropylene triamines; phenols; epoxy-modified amines obtained by reaction of an epoxy compound with the above-exemplified amines, Mannich-modified amines obtained by reaction of formalin and/or a phenol with the above-exemplified amines, Michael addition-modified amines, modified amines such as ketimines obtained by condensation reaction of an amine compound and a carbonyl compound; amine derivatives of isocyanurate, such as a 1,3-diallyl-isocyanurate/ethylene diamine adduct and a 1,3,5-triallyl-isocyanurate/ethylene diamine adduct; amine salts such as 2,4,6-tris(dimethylaminomethyl)phenol 2-ethylhexanoic acid salt; compounds having an amino group and a hydrolysable silyl in one molecule such as N-(β-aminoethyl)-γ-aminopropyltrimethoxysilane; and the like. Specific examples of ketimine compounds are described in Japanese Patent Laying-Open No. 7-242737 and the like.

Among these amine compounds, aliphatic polyamines, aromatic polyamines, alicyclic polyamines, polyamidoamines, and imidazoles are preferable because they are excellent in compatibility with the vinyl-based polymer (I), in curing rate, and in mechanical properties of a cured product, and more specifically, diethylenetriamine, triethylenetetramine, norbornanediamine, isocyanurate amine derivatives such as a 1,3,5-triallyl-isocyanurate/diethylene diamine adduct, as well as 2,4,6-tris(dimethylaminomethyl)phenol and polyoxypropylene diamines.

The term "poly" in the polyamine or polyamide means that two or more amines or amide groups are present in the structural formula of the compound.

<Thiol Compound>

As the thiol compound that is the nucleophilic agent (II), conventionally known thiol compounds can be widely used. From the viewpoint of crosslinking reaction, the thiol compound is preferably a polythiol compound. The polythiol compound is a polythiol compound having at least 2 mercapto groups (—SH), and preferable examples of such polythiol compound curing agents include ester compounds between an organic carboxylic acid having at least one mercapto group and a polyhydroxyl compound. Such organic carboxylic acid includes, for example, an organic carboxylic acid containing one mercapto group, such as mercaptoacetic acid, β-mercaptopropionic acid, o-mercaptobenzoic acid, or thioglycolic acid, and an organic carboxylic acid containing at least two mercapto groups, such as aliphatic dimercaptocarboxylic acids, and the above polyhydroxyl compound includes, for example, ethylene glycol, diethylene glycol, poly(oxyethylene) glycol, propylene glycol, poly(oxypropylene) glycol, polyoxyethylene-polyoxypropylene glycol, propane-1,3-diol, butane-1,4-diol, polyoxybutylene glycol, pentane-1,5-diol, hexane-1,6-diol, hexane-2,4,6-triol, hexane-1,2,6-triol, hexane-1,2,5-triol, glycerin, 1,1,1-trimethylol propane, pentaerythritol, poly(epichlorohydrin), sorbitol and mannitol, as well as polyoxyalkylene polyols obtained by adding alkylene oxides such as, for example, ethylene oxide and/or propylene oxide to the above polyhydric alcohols.

Other examples of the polythiol compounds include ester compounds between a hydroxyl compound having one or more mercapto groups and a polycarboxylic acid. The hydroxyl compound that can be used herein includes, for example, 2-mercaptoethanol, 1-mercapto-2-propanol, 2-mercaptoisopropanol, 3-mercaptopropanol, 4-mercaptobutanol, 3-mercapto-1,2-propanediol, 1-phenyl-2-mercaptoethanol, o-mercaptophenol, and another hydroxyl compound having one or more mercapto groups, and the polycarboxylic acid includes, for example, maleic acid, malonic acid, succinic acid, adipic acid, methylsuccinic acid, butane-1,2,3-tricarboxylic acid, butanetetracarboxylic acid, fumaric acid, itaconic acid, alkenyl-substituted succinic acid, maleated aliphatic acid, isophthalic acid, terephthalic acid, trimellitic acid, benzenecarboxylic acid, and the like.

Other preferable examples of the polythiol compound include polythiol compounds obtained by reacting a polyepoxy compound with hydrogen sulfide or a polythiol compound. Such polyepoxy compound is for example an epoxy resin having more than one glycidyl ether groups, glycidyl ester groups, glycidyl amine groups or glycidyl imine groups on average per molecule. The epoxy resin having more than one glycidyl ether groups on average per molecule includes, for example, polyglycidyl ethers of polyhydric alcohols such as ethylene glycol, propylene glycol, butane diol, glycerin and trimethylol propane; polyglycidyl ethers of mononuclear polyvalent phenols such as resorcinol, hydroquinone, pyrocatechol, floroglycinol, 1,5-dihydroxynaphthalene, 2,7-dihydroxynaphthalene and 2,6-dihydroxynaphthalene; polyglycidyl ethers of polynuclear divalent phenols including bis-(hydroxyphenyl)-alkanes such as 2,2-bis-(4-hydroxyphenyl)-propane, 2,4'-dihydroxydiphenyl methane, bis-(2-hydroxyphenyl)-methane, bis-(4-hydroxyphenyl)-methane, bis-(4-hydroxy-2,6-dimethyl-3-methoxyphenyl)-methane, 1,1-bis-(4-hydroxyphenyl)-ethane, 1,2-bis-(4-hydroxyphenyl)-ethane, 1,1-bis-(4-hydroxy-2-chlorophenyl)-ethane, 1,1-bis-(3,5-dimethyl-4-hydroxyphenyl)-ethane, 1,3-bis-(3-methyl-4-hydroxyphenyl)-propane, 2,2-bis-(3,5-dichloro-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)-propane, 2,2-bis-(4-hydroxynaphthyl)-propane, 2,2-bis-(4-hydroxyphenyl)-pentane, 3,3-bis-(4-hydroxyphenyl)-pentane, 2,2-bis-(4-hydroxyphenyl)-heptane, bis-(4-hydroxyphenyl)-methane, 1,2-bis-(4-hydroxyphenyl)-1,2-bis-(phenyl)-propane, and 2,2-bis-(4-hydroxyphenyl)-1-phenyl-propane, dihydroxybiphenyls such as 4,4'-dihydroxybiphenyl, 2,2'-dihydroxybiphenyl and 2,4'-dihydroxybiphenyl, di-(hydroxyphenyl)-sulfones such as bis-(4-hydroxyphenyl)-sulfone, 2,4'-dihydroxydiphenyl sulfone, chloro-2,4-dihydroxydiphenyl sulfone, 5-chloro-2,4-dihydroxydiphenyl sulfone, 5-chloro-4,4'-dihydroxydiphenyl sulfone and 3'-chloro-4,4'-dihydroxydiphenyl sulfone, di-(hydroxyphenyl)-ethers such as bis-(4-hydroxyphenyl)-ether, 4,3'-(or 4,2'- or 2,2'-)dihydroxy-diphenyl-ether, 4,4'-dihydroxy-2,6-dimethyldiphenyl-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxybiphenyl)-ether, 4,4'-dihydroxy-2,6-dimethoxydiphenyl-ether and 4,4'-dihydroxy-2,5-diethoxydiphenyl-ether, as well as 1,1-bis-(4-hydroxyphenyl)-2-phenyl ethane, 1,3,3-trimethyl-1-(4-hydroxyphenyl)-6-hydroxyindane and 2,4-bis-(4-hydroxyphenyl)-4-methyl pentane; polyglycidyl ethers of other polynuclear divalent phenols such as 1,4-bis-(4-hydroxybenzyl)-benzene, 1,4-bis-(4-hydroxybenzyl)-tetramethyl benzene, 1,4-bis-(4-hydroxybenzyl)-tetraethyl benzene and 1,4-bis-(4-hydroxychromyl)-tetraethyl benzene; polyglycidyl ethers of polynuclear polyvalent phenols, such as phenol/carbonyl compound initial condensates (for example, a phenol resin initial condensate, a phenol/acrolein condensation reaction product, a phenol/glyoxazole condensation reaction product, a phenol/pentane diallyl condensation reaction product, a resorcinol/acetone condensation reaction product, a xylene/phenol/formalin initial condensate) and phenol/polychloromethylated aromatic compound condensation products; and polyglycidyl ethers obtained by adding alkylene oxides such as ethylene oxide, propylene oxide and butylene oxide to the above-mentioned polyhydric alcohol, mononuclear polyvalent phenol, polynuclear divalent phenol and polynuclear polyhydric phenol and then converting the hydroxyl groups of the products into the corresponding glycidyl ethers. The epoxy resin having more than one glycidyl ester groups on average per molecule includes, for example, polyglycidyl esters Of aliphatic polycarboxylic acids or aromatic polycarboxylic acids, and homopolymers or copolymers of acrylic glycidyl esters. The epoxy resin having more than one glycidylamino groups or glycidylimino groups on average per molecule includes, for example, aromatic amines such as aniline or aniline having an alkyl substituent on its benzene nucleus, an initial condensate between the aromatic amine and an aldehyde such as formaldehyde, and polyglycidyl compounds obtained by converting the amine group of an initial condensate among the aromatic amine, the aldehyde and a phenol into a glycidylamino group or glycidylimino group. In addition to those described above, it is possible to use poly-epoxy compounds of butadiene oxide, dimethyl pentane dioxide, diglycidyl ether, butanediol diglycidyl ether, ethyleneglycol diglycidyl ether, di- or poly-ethyleneglycol diglycidyl ether, propyleneglycol diglycidyl ether, di- or poly-propyleneglycol diglycidyl ether, vinylcylohexene dioxide, neopentylglycol diglycidyl ether, diglycidyl aniline, trimethylolpropane triglycidyl ether, glycerin triglycidyl ether, limonene dioxide, resorcin diglycidyl ether, 2,6-diglycidyl phenyl glycidyl ether, 2,4-diglycidyl phenyl glycidyl ether, and the like. As the polythiol compound described above, the various polythiol compounds described herein can be used.

Other preferable compounds among the polythiol compounds mentioned above include polythiol compounds obtained by reacting epichlorohydrin with the above-polyhydroxyl compound and then reacting the product with hydrogen sulfide, and the polyhydroxyl compound includes those compounds illustrated above as the polyhydroxyl compound.

Other preferable compounds among the polythiol compounds mentioned above include compounds obtained for example by reacting sodium polysulfide with dithioterephthalic acid, 2,2'-dimercaptodiethyl ether, liquid polysulfide resin, a polyoxyalkylene polyol having a mercaptan group at its terminus, or bis(dichloroethyl) formal.

When the polythiol compound is used as the nucleophilic agent (II), a curing catalyst for the polythiol compound is preferably used although this curing catalyst is not an essential component in the curable composition of the present invention. When an amine compound and the polythiol compound are simultaneously used in the curable composition of the present invention, the amine compound can also serve as the curing catalyst. Other curing catalysts include, for example, amino compounds such as di-n-butylamine, N-methylcyclohexylamine, piperidine, α-picoline, dimethylaminomethylphenol, dimethylamino-p-cresol, N,N'-dimethylethylenediamine, bis(4-methylaminocyclohexyl) methane, piperazine, triethylamine, tripropylamine, dimethylbutylamine, dimethylpentylamine, dimethylcyclohexylamine, tri-n-butylamine, tricyclohexylamine, triethanolamine, dimethylbenzylamine, pyridine, N,N,N'.N'-tetrakis(2-cyanoethyl) ethylenediamine, bis(4-dimethylaminocyclohexyl)methane, 2-(dimethylaminomethyl)phenol, 2,4,6-tris(dimethylaminomethyl)phenol, N,N-dimethylpropane-1,3-diamine, 4-aminopyridine, 2-methylimidazole, 2-ethyl-4-methylimidazole, 2-undecylimidazole, 2-phenylimidazole, 1-benzyl-2-methylimidazole, 1-cyanoethyl-2-methylimidazole, 1-cyanoethyl-2-ethyl-4-methylimidazole, N-methyl piperazine, N,N,N'-trimethylethylenediamine, N-(2-aminoethyl)piperazine, N,N'-dimethyl piperazine, 1,4-diazacyclo(2,2,2)octane, pyridine, and the like.

When the polythiol is used as the active hydrogen-containing compound acting as the nucleophilic agent (II), the reaction is accelerated when the polythiol is used in combination with a radical initiator. The initiator used herein includes a photoradical initiator, a heat radical initiator and a redox initiator. Specific examples of the photoradical initiator include acetophenone, propiophenone, benzophenone, xanthol, fluoreine, benzaldehyde, anthraquinone, triphenylamine, carbozole, 3-methylacetophenone, 4-methylacetophenone, 3-pentylacetophenone, 2,2-diethoxyacetophenone, 4-methoxyacetopohenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzylmethoxyketal, 2-chlorothioxanthone, bis(2,4,6-trimethylbenzoyl)phenylphosphine oxide, bis(2,6-dimethoxybenzoyl)-2,4,4-trimethylpentylphosphine oxide and 2,4,6-trimethylbenzoyldiphenyl-phosphine oxide. These initiators may be used singly or in combination with other compounds.

Examples of the heat radical initiator include, but are not limited to, azo initiators, peroxide initiators, persulfate initiators, and the like.

Preferable examples of the azo initiators include, but are not limited to, 2,2'-azobis(4-methoxy-2,4-dimethylvaleronitrile) (VAZO 33), 2,2'-azobis(2-amidinopropane) dibasic acid salt (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), and 1,1-azobis(1-cyclohexanecarbonitrile) (VAZO 88) (all available from DuPont Chemical); and 2,2'-azobis(2-cyclopropylpropionitrile) and 2,2'-azobis(methylisobutyrate) (V-601) (available from Wako Pure Chemical Industries, Ltd.).

Preferable examples of the peroxide initiators include, but are not limited to, benzoyl peroxide, acetyl peroxide, lauroyl peroxide, decanoyl peroxide, dicetyl peroxydicarbonate, di(4-tert-butylcyclohexyl) peroxydicarbonate (Perkadox 16S) (available from Akzo Nobel), di(2-ethylhexyl) peroxydicarbonate, tert-butyl peroxypivalate (Lupersol 11) (available from Elf Atochem), tert-butyl peroxy-2-ethylhexanoate (Trigonox 21-050) (available from Akzo Nobel), and dicumyl peroxide.

Preferable examples of the persulfate initiators include, but are not limited to, potassium persulfate, sodium persulfate, and ammonium persulfate.

The initiators may be used alone or as a mixture of two or more thereof.

The heat radical initiator is preferably selected from the group consisting of azo initiators and peroxide initiators. The heat radical initiator is more preferably 2,2'-azobis(methylisobutyrate), benzoyl peroxide, t-butylperoxypivalate, and di(4-t-butylcyclohexyl)peroxydicarbonate, and mixture thereof.

Preferable examples of the redox (oxidation-reduction) initiators include, but are not limited to, a combination of the above persulfate initiator and a reducing agent (e.g., sodium hydrogen metasulfite or sodium hydrogen sulfite); a combination of an organic peroxide and a tertiary amine, e.g., a combination of benzoyl peroxide and dimethylaniline and a combination of cumene hydroperoxide and aniline; a combination of an organic hydroperoxide and a transition metal, e.g., a combination of cumene hydroperoxide and cobalt naphthenate. The redox initiator is preferably a combination of an organic peroxide and a tertiary amine or a combination of an organic peroxide and a transition metal, more preferably a combination of cumene hydroperoxide and aniline or a combination of cumene hydroperoxide and cobalt naphthenate.

Other initiators may be used in the curable composition of the present invention, and the other initiators include, but are not limited to, pinacols such as tetraphenyl-1,1,2,2-ethanediol.

These nucleophilic agents (II) may be used alone or as a mixture of two or more thereof. The amount of the nucleophilic agent (II) compounded is in the range of usually about 0.1 to 60 parts by weight, preferably about 0.2 to 50 parts by weight, per 100 parts by weight of the vinyl-based polymer (I). If it is lower than 0.1 parts by weight, the curing of the vinyl-based polymer (I) tends to become insufficient. On the other hand, if it exceeds 60 parts by weight, bleeding occurs at the interface, so adhesiveness tends to be undesirably lowered.

<<Epoxy Resin (III)>>

The curable composition of the present invention can further contain an epoxy resin (III). The epoxy resin (III) can be exemplified by a bisphenol A epoxy resin, a bisphenol F epoxy resin, a bisphenol AD epoxy resin, a bisphenol S epoxy resin, a glycidyl ester epoxy resin, a glycidyl amine epoxy resin, a novolak epoxy resin, a glycidyl ether epoxy resin of a bisphenol A/propylene oxide adduct, a hydrogen-added bisphenol A (hydrogenated bisphenol A) epoxy resin, a fluorinated epoxy resin, a rubber-modified epoxy resin containing polybutadiene or NBR, a flame-retardant epoxy resin such as tetrabromobisphenol A glycidyl ether, a p-oxybenzoic acid glycidyl ether ester epoxy resin, an m-aminophenol epoxy resin, a diaminodiphenylmethane epoxy resin, an urethane-modified epoxy resin having an urethane bond, various kinds of alicyclic epoxy resins, N,N-diglycidylaniline, N,N-diglycidyl-o-toluidine, triglycidyl isocyanurate, polyalkylene glycol diglycidyl ether, glycidyl ether of polyhydric alcohol such as glycerin, a hydantoin epoxy resin, and an epoxide of an unsaturated polymer such as a petroleum resin, without any purpose of restriction, and commonly used epoxy resins may be used. These epoxy resins may be used alone or two or more of them may be used in combination.

Among these epoxy resins, those having at least 1 epoxy group in one molecule are preferable since, for example, they have high reactivity and the cured product obtained tends to form a three-dimensional network structure upon curing. To make a cured product transparent which is obtained by curing the curable composition of the invention containing the vinyl-based polymer and the epoxy resin, the epoxy resin is preferably compatible with the vinyl-based polymer, and for example, a hydrogenated bisphenol A epoxy resin is easily compatible with various vinyl-based polymers, thus easily forming transparent cured products.

The curable composition wherein the vinyl-based polymer is excellent in compatibility with the epoxy resin, easily forms a structure undergoing Spinodal decomposition upon curing, whereby a transparent cured product is easily given. In addition, mechanical properties may be significantly improved.

The amount of the epoxy resin (III) compounded is in the range of 0.5 to 900 parts by weight based on 100 parts by weight of the vinyl-based polymer (I), but is preferably 1 to 500 parts by weight, more preferably 2 to 300 parts by weight, from the viewpoint of the balance among mechanical properties, flexibility, oil resistance and weather resistance. When the amount is less than 0.5 parts by weight, strength and adhesiveness characteristic of the epoxy resin are hardly expressed, while when the amount is more than 900 parts by weight, flexibility, oil resistance, heat resistance and weather resistance tend to be deteriorated.

When the epoxy resin (III) is contained in the curable composition of the present invention, a curing agent for the epoxy resin (epoxy resin curing agent) is preferably added.

The epoxy resin curing agent that can be used in the present invention includes the same curing agent as described above in the nucleophilic agent (II), and other examples include acid anhydrides, blocked carboxylic acids, mercaptan-based compounds, compounds obtained by neutralizing a Lewis acid with a Lewis base, and the like.

Among these epoxy resin curing agents, 2,4,6-tris(dimethylaminomethyl) phenol and polyoxypropylene diamine are preferable from the viewpoint of the balance between curability and physical properties.

The amount of the epoxy resin curing agent compounded is preferably 0.5 to 200 parts by weight, more preferably 1 to 100 parts by weight, based on 100 parts by weight of the epoxy resin. When the amount is less than 0.5 parts by weight, curability tends to be deteriorated, while when the amount is greater than 200 parts by weight, the curing agent component may bleed to deteriorate adhesiveness, and oil resistance, heat resistance and weather resistance tend to be deteriorated.

When the used nucleophilic agent (II) also acts as an epoxy resin curing agent in the epoxy resin (III)-containing curable composition of the present invention, it is not necessary to add another epoxy resin curing agent separately. In this case, the amount of the nucleophilic agent (II) compounded is preferably 1 to 60 parts by weight, more preferably 2 to 50 parts by weight, based on 100 parts by weight in total of the vinyl-based polymer (I) and the epoxy resin (III).

<<Curable Composition>>

In the curable composition of the present invention, various additives may be added depending on the intended physical properties.

<Monomer/Oligomer>

Depending on the object, polymerizable monomers and/or oligomers and various additives may be simultaneously used in the curable composition of the present invention. The polymerizable monomers and/or oligomers include those having an acrylic functional group (e.g., a (meth)acryloyl group), a styrene group, an acrylonitrile group, a vinyl ester group, an N-vinylpyrrolidone group, an acrylamide group, a conjugated diene group, a vinyl ketone group, a vinyl chloride group, and the like. In particular, those having (meth)acryloyl groups are preferred.

Specific examples of the monomers include (meth)acrylate monomers, cyclic acrylates, N-vinylpyrrolidone, styrene-based monomers, acrylonitrile, N-vinylpyrrolidone, acrylamide-based monomers, conjugated diene-based monomers, and vinyl ketone-based monomers. Examples of the (meth)acrylate monomers include n-butyl(meth)acrylate, 2-ethylhexyl(meth)acrylate, isooctyl(meth)acrylate, isonoyl(meth)acrylate, and compounds represented by the following formulae. In the following formulae, "n" represents an integer of 0 to 20.

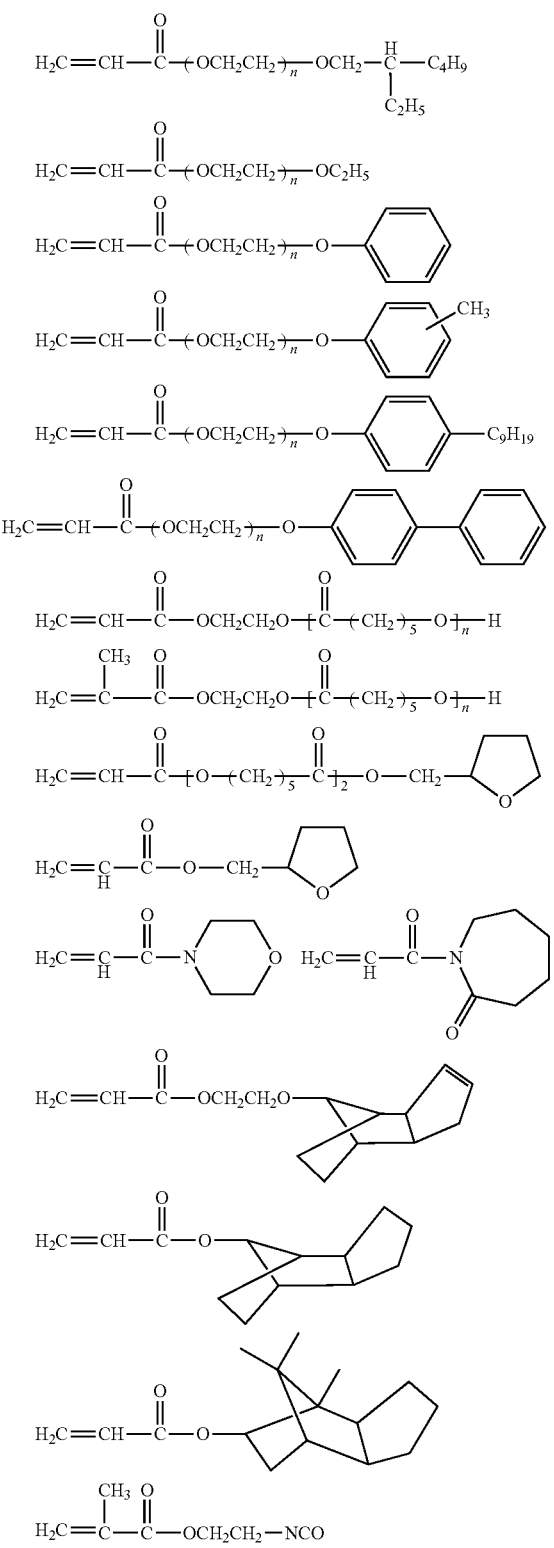

-continued

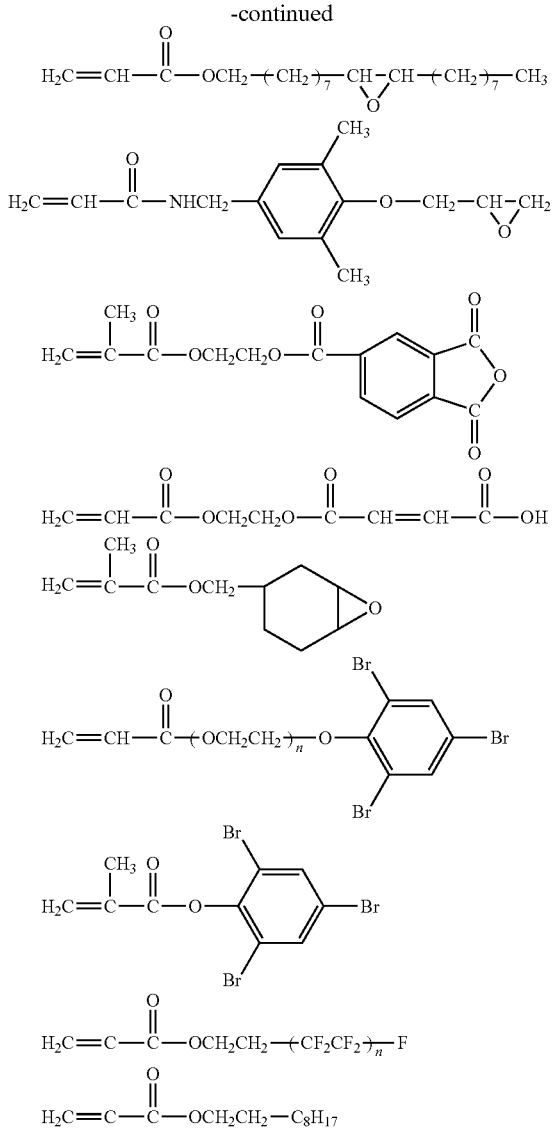

Examples of the styrene-based monomers include styrene and α-methylstyrene, examples of the acrylamide-based monomers include acrylamide and N,N-dimethylacrylamide, examples of the conjugated diene-based monomers include butadiene and isoprene, and example of the vinyl ketone-based monomers include methyl vinyl ketone.

Examples of the polyfunctional monomers include neopentylglycol polypropoxydiacrylate, trimethylolpropane polyethoxytriacrylate, bisphenol F polyethoxydiacrylate, bisphenol A polyethoxydiacrylate, dipentaerythritol polyhexanolide hexacrylate, tris(hydroxyethyl)isocyanurate polyhexanolide triacrylate, tricyclodecanedimethylol diacrylate 2-(acryloyloxy-1,1-dimethyl)-5-ethyl-5-acryloyloxymethyl-1,3-dioxane, tetrabromobisphenol A diethoxydiacrylate, 4,4-dimercaptodiphenyl sulfide dimethacrylate, polytetraethylene glycol diacrylate, 1,9-nonanediol diacrylate, and ditrimethylolpropane tetraacrylate.

Examples of the oligomers include epoxy acrylate resins such as bisphenol A epoxy acrylate resins, phenol novolac epoxy acrylate resins, and cresol novolac epoxy acrylate resins; COOH-modified epoxy acrylate resins; urethane acrylate resins prepared by reacting urethane resins with a hydroxyl group-containing (meth)acrylate [hydroxyethyl(meth)acrylate, hydroxypropyl(meth)acrylate, hydroxylbutyl(meth)acrylate, pentaerythritol triacrylate, or the like], the urethane resins being prepared from polyols (polytetramethylene glycol, polyester diol of ethylene glycol and adipic acid, ε-caprolactone-modified polyester diol, polypropylene glycol, polyethylene glycol, polycarbonate diol, hydroxyl group-terminated hydrogenated polyisoprene, hydroxyl group-terminated polybutadiene, hydroxyl group-terminated polyisobutylene, and the like) and organic isocyanates (tolylene diisocyanate, isophorone diisocyanate, diphenylmethane diisocyanate, hexamethylene diisocyanate, xylylene diisocyanate, and the like); resins prepared by introducing (meth) acryl groups via ester bonds into the above polyols; and polyester acrylate resins.

These monomers and oligomers are selected depending on the initiator and curing conditions used.

The number-average molecular weight of the polymerizable monomers and/or oligomers is preferably 2000 or less, more preferably 1000 or less, because of excellent compatibility.

<Adhesion-Conferring Agent>

The curable composition of the present invention may contain a silane coupling agent and an adhesion-conferring agent other than the silane coupling agent. If the adhesion-conferring agent is added, the risk of peeling off of a sealant from an adherend such as a siding board may be decreased due to alteration of jointing width or the like by external power. In some cases, a primer for improving the adhesiveness is not required so as to simplify the processing work. The silane coupling agent can be exemplified by silane coupling agents having a functional group such as an amino group, a mercapto group, an epoxy group, a carboxyl group, a vinyl group, an isocyanate group, an isocyanurate group and a halogen, and specific examples thereof include isocyanate group-containing silanes such as γ-isocyanatepropyltrimethoxysilane, γ-isocyanatepropyltriethoxysilane, γ-isocyanatepropylmethyldiethoxysilane, and γ-isocyanatepropylmethyldimethoxysilane; amino-containing silanes such as γ-aminopropyltrimethoxysilane, γ-aminopropyltriethoxysilane, γ-aminopropyltriisopropoxysilane, γ-aminopropylmethyldiimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis (2-methoxyethoxy) silane and N-β-(carboxymethyl)aminoethyl-γ-aminopropyltrimethoxysilane; vinyl unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; isocyanurate silanes such as tris (trimethoxysilyl)isocyanurate; and the like. Modification derivatives of these, for example amino-modified silyl polymers, silylated aminopolymers, unsaturated aminosilane complexes, phenylamino-long chain alkylsilanes, aminosilylated silicones, block isocyanate silanes, silylated polyesters and the like, can also be used as the silane coupling agents.

The silane coupling agent used in the present invention is used generally in the range of 0.1 to 20 parts by weight relative to 100 parts by weight of the vinyl-based polymer (I). In particular, the use thereof in the range of 0.5 to 10 parts by weight is preferred. As for the effect of the silane coupling agent added to the curable composition of the present invention, it produces marked adhesive property-improving effects under non-primer or primer-treated conditions when the composition is applied to various adherend materials, namely inorganic materials such as glass, aluminum, stainless steel, zinc, copper and mortar, or organic materials such as polyvinyl chloride, acrylics, polyesters, polyethylene, polypropylene and polycarbonates. When it is used under non-primer conditions, the improving effects on the adhesiveness to various adherends are particularly remarkable.

Specific examples of the agent other than the silane coupling agent include, but are not limited to, epoxy resins, phenol resins, sulfur, alkyl titanates and aromatic polyisocyanates, among others.

The adhesion-conferring agent mentioned above may be used singly or as a mixture of two or more thereof. By adding these adhesion-conferring agents, it is possible to improve the adhesiveness to adherends. Among the adhesion-conferring agents mentioned above, silane coupling agents are preferably used in combination in an amount of 0.1 to 20 parts by weight to improve the adhesion, in particular the adhesion to the metal adherend surface such as an oil pan surface, although this is not critical.

According to the type and amount of the adhesion-conferring agent added, the curability, mechanical property and the like in the present invention may be controlled in accordance with the purposes and uses. The above-mentioned selection requires attention since it affects the curability and elongation in particular.

<Plasticizer>

Various kinds of plasticizers may be used if necessary for the curable composition of the present invention. If a plasticizer is used in combination with a filler which will be described later, the elongation of the cured product can be increased and a large amount of filler can be advantageously mixed in the composition. However, the plasticizer is not an indispensable agent. The plasticizer is not particularly limited, but may, according to the purpose of adjusting physical and other properties, be selected from, for example, phthalate esters such as dibutyl phthalate, diheptyl phthalate, di(2-ethylhexyl)phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol esters; phosphate esters such as tricresyl phosphate and tributyl phosphate; trimellitate esters; polystyrene and polystyrene derivatives such as poly-α-methylstyrene; polybutadiene, polybutene, polyisobutylene, butadiene-acrylonitrile, and polychloroprene; chlorinated paraffins; hydrocarbon oils such as alkyldiphenyls and partially hydrogenated terphenyl; process oils; polyethers including polyether polyols such as polyethylene glycol, polypropylene glycol and polytetramethylene glycol and derivatives of such polyether polyols as those resulting from conversion of the hydroxyl group(s) thereof to an ester group, an ether group or the like; epoxy plasticizers such as epoxidized soybean oil and benzyl epoxystearate; polyester type plasticizers obtained from a dibasic acid such as sebacic acid, adipic acid, azelaic acid or phthalic acid and a dihydric alcohol such as ethylene glycol, diethylene glycol, triethylene glycol, propylene glycol or dipropylene glycol; (meth)acrylic polymers obtained by polymerizing vinyl-based monomer(s) by various methods of polymerization as represented by acrylic plasticizers; and the like.

By adding a high-molecular-weight plasticizer, which is a polymer having a number-average molecular weight of 500 to 15,000, it becomes possible to adjust the viscosity and/or slump tendency of the curable composition as well as mechanical properties such as tensile strength and elongation of the cured products obtained by curing that composition, and as compared with the cases where a low-molecular-weight plasticizer containing no polymer component within the molecule is used, it becomes possible to maintain the initial physical properties for a long period of time and to improve the drying property (also called as coatability) in the case where an alkyd paint is applied to the cured product. This high-molecular-weight plasticizer may have a functional group(s) or may not have any functional group, without any limitation.

The number-average molecular weight of the above-mentioned high-molecular-weight plasticizer, which may be in the range of 500 to 15,000 as mentioned above, is preferably 800 to 10,000, more preferably 1,000 to 8,000. When the molecular weight is too low, the plasticizer will flow out upon exposure to heat and/or rain with the lapse of time, failing to maintain the initial physical properties for a long period of time, and the alkyd coatability may not be improved. When the molecular weight is too high, the viscosity increases, and the workability deteriorates.

Among these high-molecular-weight plasticizers, those compatible with the vinyl-based polymer (I) are preferable. From the viewpoint of compatibility, weather resistance and heat resistance, (meth)acrylic polymers are preferable. Among (meth)acrylic polymers, acrylic polymers are further preferred. These acrylic polymers include conventional ones obtainable by the conventional solution polymerization, solventless acrylic polymers, and the like. The latter acrylic plasticizers are more suited for the purpose of the present invention since they are produced by high-temperature continuous polymerization techniques (U.S. Pat. No. 4,414,370, Japanese Patent Laying-Open No. 59-6207, JP-B 5-58005, Japanese Patent Laying-Open No. 1-313522, U.S. Pat. No. 5,010,166) without using any solvent or chain transfer agent. Examples thereof include, but are not limited to, UP series manufactured by Toagosei Co., Ltd. (see Kogyo Zairyo, October, 1999). As a matter of course, the living radial polymerization method can also be mentioned as another synthesis method. This method is preferred since it can give polymers with a narrow molecular weight distribution and a reduced viscosity, and furthermore the atom transfer radical polymerization method is more preferred, although the polymerization method is not limited to those mentioned above.

The molecular weight distribution of the high-molecular-weight plasticizer is not particularly limited but it is preferably narrow, namely lower than 1.8, more preferably not higher than 1.7, still more preferably not higher than 1.6, still further preferably not higher than 1.5, particularly preferably not higher than 1.4, most preferably not higher than 1.3.

The plasticizers, including the high-molecular-weight plasticizers mentioned above, may be used singly or two or more of them may be used in combination, although the use thereof is not always necessary. If necessary, a high-molecular-weight plasticizer may be used, and a low-molecularweight plasticizer may further be used in combination in such a range that the physical properties are not adversely affected.

These plasticizers may also be incorporated at the time of production of the vinyl-based polymer (I).

When a plasticizer is used, the amount the plasticizer used is not limited, but is generally 5 to 150 parts by weight, preferably 10 to 120 parts by weight, more preferably 20 to 100 parts by weight, per 100 parts by weight of the vinyl-based polymer (I). When it is smaller than 5 parts by weight, the plasticizing effect is hardly produced, and when it exceeds 150 parts by weight, the mechanical strength of cured products tends to become insufficient.

<Filler>

In the curable composition of the present invention, various fillers may be used as necessary. The fillers are used because a reduction in loss coefficient (damping characteristic) in the high-temperature range particularly at 80° C. or more can be generally ameliorated, although it depends on the kind of the filler. The fillers include, but are not limited to, reinforcing fillers such as wood flour, pulp, cotton chips, asbestos, glass fibers, carbon fibers, mica, walnut shell flour, rice hull flour, graphite, diatomaceous earth, white clay, silica (e.g. fumed silica, precipitated silica, crystalline silica, fused silica, dolomite, silicic anhydride, hydrous silicic acid or the like) and carbon black; fillers such as ground calcium carbonate, precipitated calcium carbonate, magnesium carbonate, diatomaceous earth, calcined clay, clay, talc, titaniumoxide, bentonite, organicbentonite, ferricoxide, red iron oxide, fine aluminum powder, flint powder, zinc oxide, activated zinc flower, zinc powder, zinc carbonate and shirasu balloons; fibrous fillers such as asbestos, glass fibers and glass filaments, carbon fibers, Kevlar fibers and polyethylene fibers; and the like.

Preferred among these fillers are precipitated silica, fumed silica, crystalline silica, fused silica, dolomite, carbon black, calcium carbonate, titanium oxide, talc and the like.

Particularly, when high strength cured products are to be obtained using these fillers, a filler selected from among fumed silica, precipitated silica, silicic acid anhydride, hydrous silicic acid, carbon black, surface-treated fine calcium carbonate, crystalline silica, fused silica, calcined clay, clay and activated zinc flower may be mainly added. Among them, those advantageously used are supermicropowder silicas having a specific surface area (measured by BET adsorption method) in a degree of not less than 50 m$^2$/g, usually 50 to 400 m$^2$/g, and preferably 100 to 300 m$^2$/g. Further preferred are silicas the surface of which is subjected to hydrophobic treatment in advance with organic silicon compounds such as organosilanes, organosilazanes or diorganocyclopolysiloxanes.

Specific examples of the reinforced silica type filler include, but are not limited to, fumed silica, e.g., Aerosil manufactured by Nippon Aerosil Co., Ltd., and precipitated silica, e.g., Nipsil manufactured by Nihon Silica Kogyo.

In particular when low-strength, high-elongation cured products are to be obtained using such fillers, fillers selected from titanium oxide, calcium carbonate, talc, ferric oxide, zinc oxide, shirasu balloons and the like may be added. Generally, calcium carbonate, when small in specific surface area, may not be so effective in improving the strength at break, elongation at break, adhesion and weather-resistant adhesion of cured products. As the specific surface area value increases, the effects of improving the strength at break, elongation at break, adhesion and weather-resistant adhesion become better.

Furthermore, calcium carbonate is more preferably surface-treated with a surface treating agent. When surface-treated calcium carbonate is used, it is expected that the workability of the curable composition of the present invention be improved and the effects of improving the adhesion and weather-resistant adhesion of the curable composition be more improved as compared with the use of non-surface-treated calcium carbonate. Useful as the surface treating agent are organic substances such as fatty acids, fatty acid soaps and fatty acid esters, various surfactants, and various coupling agents such as silane coupling agents and titanate coupling agents. Specific examples thereof include, but are not limited to, fatty acids such as caproic acid, caprylic acid, pelargonic acid, capric acid, undecanoic acid, lauric acid, myristic acid, palmitic acid, stearic acid, behenic acid and oleic acid, sodium, potassium and other salts of such fatty acids, and alkyl esters of such fatty acids. Specific examples of the surfactants include sulfate ester type anionic surfactants such as polyoxyethylene alkyl ether sulfate esters and long-chain alcohol sulfate esters, and sodium, potassium and other salts thereof, sulfonic acid type anionic surfactants such as alkylbenzenesulfonic acids, alkylnaphthalenesulfonic acids, paraffinsulfonic acids, α-olefinsulfonic acids and =62-alkylsulfosuccinic acid, and sodium, potassium and other salts thereof, and the like. In the surface treatment, the surface treating agent is used in an amount preferably in the range of 0.1 to 20% by weight, more preferably in the range of 1 to 5% by weight, relative to calcium carbonate. When the amount for treatment is smaller than 0.1% by weight, the effects of improving the workability, adhesion and weather-resistant adhesion maybe insufficient, and when it exceeds 20% by weight, the storage stability of the curable composition may decrease.

When calcium carbonate is used in expectation of producing the effects of improving the thixotropic properties of the curable composition and the strength at break, elongation at break, adhesion, weather-resistant adhesion and the like of the cured product, in particular, precipitated calcium carbonate is preferably used, although this does not mean any particular restriction.

On the other hand, ground calcium carbonate is sometimes added for the purpose of reducing the viscosity of the curable composition, increasing the weight thereof and reducing the cost, for example. When ground calcium carbonate is used, such species as mentioned below can be used if necessary.

Ground calcium carbonate is prepared from natural chalk, marble, limestone or the like by mechanical grinding/processing. The method of grinding includes the dry method and wet method. Wet ground products are unfavorable in many cases since they often deteriorate the storage stability of the curable composition of the present invention. Upon classification, ground calcium carbonate gives various products differing in average particle size. In cases where the effects of improving the strength at break, elongation at break, adhesion and weather-resistant adhesion of the cured product are expected, the specific surface area value is preferably not less than 1.5 m$^2$/g and not more than 50 m$^2$/g, more preferably not less than 2 m$^2$/g and not more than 50 m$^2$/g, still more preferably not less than 2.4 m$^2$/g and not more than 50 m$^2$/g, most preferably not less than 3 m$^2$/g and not more than 50 m$^2$/g, although this does not mean any particular restriction. When the specific surface area is smaller than 1.5 m$^2$/g, those improving effects may be insufficient. Of course, the above does not apply to the cases where it is only intended to reduce the viscosity and/or increase the weight.

The specific surface area value is the measured value obtained by using, as the measurement method, the air permeation method (method for specific surface area determination based on the permeability of a powder-packed layer to air) carried out according to JIS K 5101. Preferred for use as the measuring instrument is a model SS-100 specific surface area measuring apparatus manufactured by Shimadzu Corporation.

Those fillers may be used singly or two or more of them may be used in combination according to the intended purpose or necessity. For example, the combined use, according to need, of ground calcium carbonate having a specific surface area value of not smaller than 1.5 $m^2/g$ and precipitated calcium carbonate is fully expected to suppress the viscosity increase in the curable composition to a moderate level and produce the effects of improving the strength at break, elongation at break, adhesion and weather-resistant adhesion of cured products, although this does not mean any particular restriction.

When a filler is used, the amount of the filler added is preferably in the range of 5 to 1,000 parts by weight, more preferably in the range of 20 to 500 parts by weight, particularly preferably in the range of 40 to 300 parts by weight, based on 100 parts by weight of the vinyl-based polymer (I). When the amount of the filler compounded is lower than 5 parts by weight, the effects of improving the strength at break, elongation at break, adhesion and weather-resistant adhesion may be insufficient, and when the amount exceeds 1,000 parts by weight, the workability of the curable composition may deteriorate. Those fillers may be used singly or two or more of them may be used in combination.

<Hollow Microsphere>

Furthermore, for the purpose of reducing the weight and cost without causing significant deteriorations in physical properties, hollow microspheres may be used in combination with such a reinforcing filler as mentioned above.

Such hollow microspheres (hereinafter referred to as "balloons") are not particularly limited but include, for example, hollow spheres constituted of an inorganic or organic material and having a diameter of not greater than 1 mm, preferably not greater than 500 µm, more preferably not greater than 200 µm, as described in "Kinosei Fira no Saishin Gijutsu (Latest Technology of Functional Fillers)" (CMC Publishing CO., LTD). In particular, hollow microspheres having a true specific gravity of not higher than 1.0 $g/cm^3$ are preferably used, and more preferably, hollow microspheres having a true specific gravity of not higher than 0.5 $g/cm^3$ are used.

The inorganic balloons include silicic balloons and non-silicic balloons. Examples of the silicic balloons are shirasu balloons, perlite, glass balloons, silica balloons, fly ash balloons and the like, and examples of the non-silicic balloons are alumina balloons, zirconia balloons, carbon balloons and the like. Commercially available as specific examples of such inorganic balloons are Winlite manufactured by Idichi Kasei and Sankilite manufactured by Sanki Kogyo Co., Ltd. (shirasu balloons), Caloon manufactured by Nippon Sheet Glass Co., Ltd., Cel-Star Z-28 manufactured by Sumitomo 3M Limited, Micro Balloon manufactured by Emerson & Cuming Company, Celamic Glassmodules manufactured by Pittsburgh Corning Corporation and Glass Bubbles manufactured by Sumitomo 3M Limited (glass balloons), Q-Cel manufactured by Asahi Glass Co., Ltd and E-Spheres manufactured by Taiheiyo Cement Corporation (silica balloons), Cerospheres manufactured by Pfamarketing and Fillite manufactured by Fillite U.S.A. (fly ash balloons), BW manufactured by Showa Denko K. K. (alumina balloons), Hollow Zirconium Spheres manufactured by Zircoa Inc. (zirconia balloons), and Kurekasphere manufactured by Kureha Chemical Industry and Carbosphere manufactured by General Technologies Inc. (carbon balloons).

The organic balloons include thermosetting resin balloons and thermoplastic resin balloons. Examples of the thermosetting resin balloons are phenol balloons, epoxy balloons and urea balloons, and examples of the thermoplastic resin balloons are Saran balloons, polystyrene balloons, polymethacrylate balloons, polyvinyl alcohol balloons and styrene-acrylic type balloons. Crosslinked thermoplastic resin balloons can also be used. The balloons so referred to herein may be balloons after expansion or balloons produced by expansion following incorporation of a blowing agent-containing resin.

Specific examples of such organic balloons which are commercially available include Ucar and Phenolic Microballoons manufactured by Union Carbide Corporation (phenol balloons), Eccospheres manufactured by Emerson & Curling Company (epoxy balloons), Eccospheres VF-O manufactured by Emerson & Cuming Company (urea balloons), Saran Microspheres manufactured by Dow Chemical Company, Expancel manufactured by Nippon Filament and Matsumoto Microspheres manufactured by Matsumoto Yushi Seiyaku Co., Ltd. (Saran balloons), Dylite Expandable Polystyrene manufactured by Arco Polymers Inc. and Expandable Polystyrene Beads manufactured by BASF-Wyandotte (polystyrene balloons), and SX863(P) manufactured by JSR Corporation (crosslinked styrene-acrylic acid balloons).

The above-mentioned balloons may be used singly or two or more of them may be used in admixture. Furthermore, those balloons surface-treated with a fatty acid, a fatty acid ester, rosin, rosin acid lignin, a silane coupling agent, a titanium coupling agent, an aluminum coupling agent, polypropylene glycol or the like for improving the dispersibility and the workability of the curable composition may also be used. These balloons are used for reducing the weight and cost without impairing the flexibility and elongation/strength among the physical properties after curing of the curable composition.

The balloon content is not particularly limited, but the balloons can be used preferably in an amount in the range of 0.1 to 50 parts by weight, more preferably 0.1 to 30 parts by weight, based on 100 parts by weight of the vinyl-based polymer (I). When this amount is smaller than 0.1 parts by weight, the weight-reducing effect is slight, and when it exceeds 50 parts by weight, a decrease in tensile strength, among the mechanical properties after curing of the balloon-containing curable composition, is observed in some instances. When the balloons have a specific gravity of not lower than 0.1, the amount is preferably 3 to 50 parts by weight, more preferably 5 to 30 parts by weight.

<Physical Property Modifier>

The curable composition of the present invention may be compounded if necessary with a physical property modifier capable of adjusting the tensile properties of the resulting cured products.

The physical property modifiers are not particularly limited but include, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane, γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; polysiloxanes; and the like. By using the above-mentioned physical property modifier, it is possible to increase the hardness of the cured products after curing of the curable composition of the present invention or decrease such hardness and attain extensibility. Such physical property modifiers as mentioned above may be used singly or two or more of them may be used in combination.

<Silanol-Containing Compound>

A silanol-containing compound may optionally be added to the curable composition of the present invention to change the physical properties of the cured product, for example. The silanol-containing compound refers to a compound having one silanol group in its molecule and/or a compound capable of forming a compound having one silanol group in its molecule by reaction with moisture. When these compounds are used, only one of the above two compounds may be used, or both of them may be used simultaneously.

The compound having one silanol group in its molecule is not particularly limited. The compound includes compounds which can be represented by the formula $(R'')_3SiOH$ (wherein R''s are the same or different kind of substituted or unsubstituted alkyl or aryl group), for example, the following compounds:

$(CH_3)_3SiOH$, $(CH_3CH_2)_3SiOH$, $(CH_3CH_2CH_2)_3SiOH$, $(n-Bu)_3SiOH$, $(sec-Bu)_3SiOH$, $(t-Bu)_3SiOH$, $(t-Bu)Si(CH_3)_2OH$, $(C_5H_{11})_3SiOH$, $(C_6H_{13})_3SiOH$, $(C_6H_5)_3SiOH$, $(C_6H_5)_2Si(CH_3)OH$, $(C_6H_5)Si(CH_3)_2OH$, $(C_6H_5)_2Si(C_2H_5)OH$, $C_6H_5Si(C_2H_5)_2OH$, $C_6H_5CH_2Si(C_2H_5)_2OH$, $C_{10}H_7Si(CH_3)_2OH$ (wherein $C_6H_5$ represents a phenyl group and $C_{10}H_7$ represents a naphthyl group);

silanol group-containing cyclic polysiloxanes compounds, for example, the following compounds:

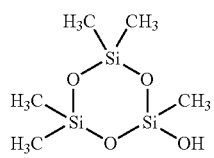

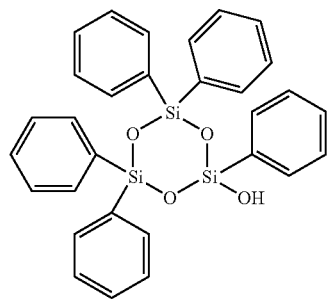

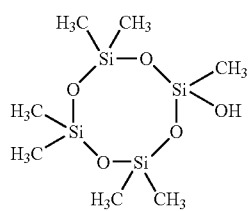

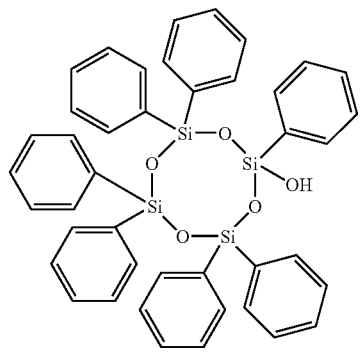

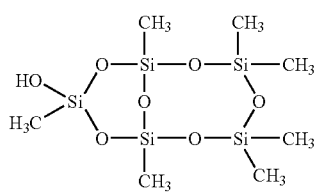

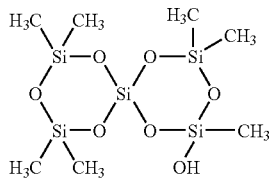

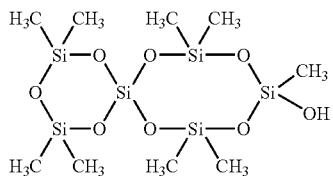

silanol group-containing chain polysiloxane compounds, for example, the following compounds:

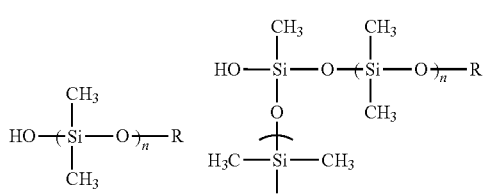

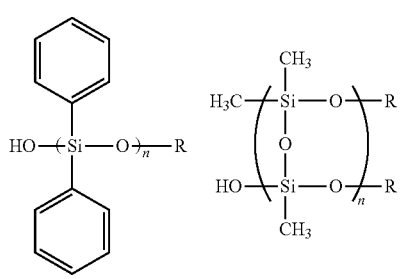

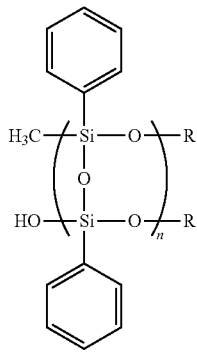

(wherein n is an integer of 1 to 20);

compounds the polymer main chain of which is composed of silicon and carbon atoms and in which a silanol group is bonded at the molecular terminus, for example, the following compounds:

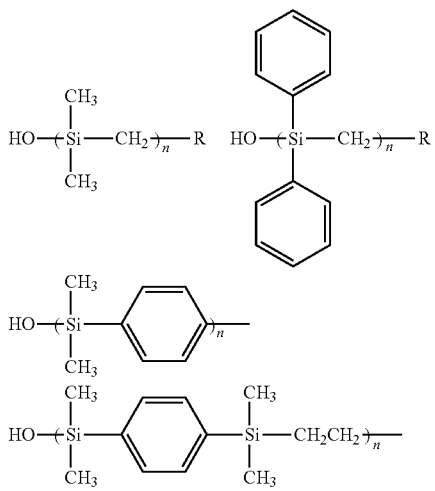

(wherein n is an integer of 1 to 20);

compounds in which a silanol group is bonded to the main chain of polysilane at a molecular terminus, for example, the following compounds:

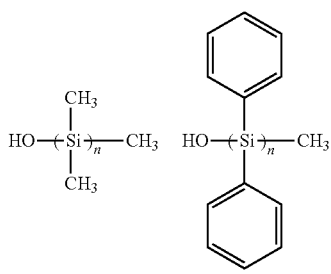

(wherein n is an integer of 1 to 20);

compounds the polymer main chain of which is composed of silicon, carbon and oxygen atoms and in which a silanol group is bonded at the molecular terminus, for example, the following compounds:

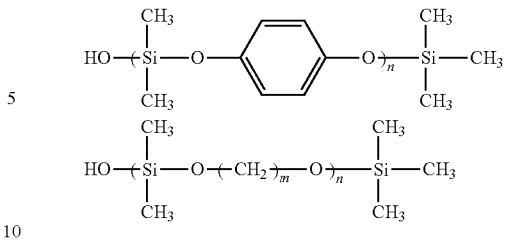

(wherein n is an integer of 1 to 20).

Among them, the compounds represented by the following formula (28) are preferred.

$(R^{29})_3SiOH$            (28)

(wherein $R^{29}$ represents a monovalent hydrocarbon group having 1 to 20 carbon atoms, and a plurality of $R^{29}$ may be the same or different).

$R^{29}$ is preferably a methyl group, an ethyl group, a vinyl group, a t-butyl group or a phenyl group, more preferably a methyl group.

$R^{29}$ is particularly preferably $(CH_3)_3SiOH$ or the like, of which the molecular weight is small, in view of ready availability and effects.

It is presumed that when a silane coupling agent-based adhesion-conferring agent is used, the compound having one silanol group in its molecule reacts with a silyl group or with a siloxane bond formed by crosslinking, thereby preventing excessive crosslinking with the silane coupling agent, thus giving flexibility to a crosslinked cured product.

The compound capable of forming a compound having one silanol group in its molecule by reaction with moisture is not particularly limited, but is preferably a compound reacting with moisture to form the compound having one silanol group in its molecule (hydrolysis product) represented by the general formula (28). For example, the following compounds may be mentioned in addition to the compounds represented by the general formula (29) shown later. However, these are not particularly limitative.

Such compounds which may be suitably used are N,O-bis (trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, $(CH_3)_3SiNHSi(CH_3)_3$, $(CH_3)_3SiNSi(CH_3)_2$, and the following compounds:

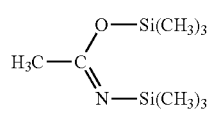

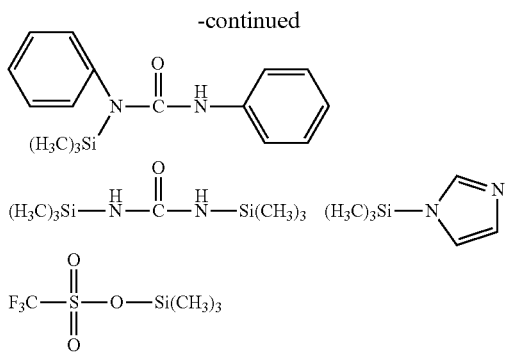

Among them, $(CH_3)_3SiNHSi(CH_3)_3$ is particularly preferred in view of an amount of contained silanol groups in a hydrolysis product.

The compound capable of forming a compound having one silanol group in its molecule by reaction with moisture is not particularly limited, but the compounds represented by the following general formula (29) are preferred in addition to the above compounds:

(wherein $R^{29}$ is as defined above; n represents a positive number, and $R^{30}$ represents a group exclusive of a part of or all of active hydrogen atoms from an active hydrogen-containing compound).

$R^{58}$ is preferably a methyl group, an ethyl group, a vinyl group, a t-butyl group or a phenyl group, more preferably a methyl group.

The $(R^{29})_3Si$ group is preferably a trimethylsilyl group in which all three $R^{29}$s are methyl groups, and n is preferably 1 to 5.

Active hydrogen-containing compounds, which are origins of the above $R^{30}$, include, but are not limited to, alcohols such as methanol, ethanol, n-butanol, i-butanol, t-butanol, n-octanol, 2-ethylhexanol, benzyl alcohol, ethylene glycol, diethylene glycol, polyethylene glycol, propylene glycol, dipropylene glycol, polypropylene glycol, propanediol, tetramethylene glycol, polytetramethylene glycol, glycerin, trimethylolpropane and pentaerythritol; phenols such as phenol, cresol, bisphenol A and hydroquinone; carboxylic acids such as formic acid, acetic acid, propionic acid, lauric acid, palmitic acid, stearic acid, behenic acid, acrylic acid, methacrylic acid, oleic acid, linolic acid, linolenic acid, sorbic acid, oxalic acid, malonic acid, succinic acid, adipic acid, maleic acid, benzoic acid, phthalic acid, terephthalic acid and trimellitic acid; ammonia; amines such as methylamine, dimethylamine, ethylamine, diethylamine, n-butylamine and imidazole; acid amides such as acetamide and benzamide; ureas such as urea and N,N'-diphenylurea; and ketones such as acetone, acetylacetone and 2,4-heptadione.

Although it is not particularly limited, a compound capable of forming a compound having one silanol group in its molecule by reaction with moisture, represented by the above general formula (29), is obtainable by, for example, subjecting the above-mentioned active hydrogen-containing compound or the like to the reaction with the compound having a group capable of reacting with the active hydrogen such as a halogen group, together with a $(R^{23})_3Si$ group also referred to as a "silylating agent" such as trimethylsilyl chloride or dimethyl(t-butyl)chloride. In the above description, $R^{23}$ is the same as defined above.

The compounds represented by the general formula (29) include, but are not limited to, allyloxytrimethylsilane, N,O-bis(trimethylsilyl)acetamide, N-(trimethylsilyl)acetamide, bis(trimethylsilyptrifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, and the like. These may be used singly or in combination of two or more.

Additionally, the compounds which may be represented by the general formula
$(((R^{31})_3SiO)(R^{32}O)_s)_tZ$,
$CH_3O(CH_2CH(CH_3)O)_5Si(CH_3)_3$,
$CH_2=CHCH_2(CH_2CH(CH_3)O)_5Si(CH_3)_3$,
$(CH_3)_3SiO(CH_2CH(CH_3)O)_5Si(CH_3)_3$,
$(CH_3)_3SiO(CH_2CH(CH_3)O)_7Si(CH_3)_3$
(wherein $R^{31}$ represents the same or different kind of substituted or unsubstituted monovalent hydrocarbon group or a hydrogen atom; $R^{32}$ is a divalent hydrocarbon group having 1 to 8 carbon atoms; s and t are positive integers, s is 1 to 6, and s times t is not less than 5; and Z is a mono- to hexa-valent organic group), are also suitably used. These may be used singly or in combination of two or more.

Among the compounds capable of forming a compound having one silanol group in its molecule by reaction with moisture, the active hydrogen-containing compounds formed after hydrolysis are preferably phenols, acid amides and alcohols since there are no adverse effects on storage stability, weather resistance or the like. More preferred are phenols and alcohols in which the active hydrogen-containing compound is a compound having a hydroxyl group.

Among the above compounds, preferred are N,O-bis(trimethylsilyl)acetamide, N-(trimethylsilyl)acetamide, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, and the like.

The compounds capable of forming a compound having one silanol group in its molecule by reaction with moisture produces the compound having one silanol group in its molecule by reacting with moisture during storage or during or after curing. It is presumed that when silane coupling agent-based adhesion-conferring agent is used, the flexibility of a cured product is given by reaction of the thus formed compound having one silanol group in its molecule with the crosslinkable silyl group of the vinyl-based polymer or a siloxane bond formed by crosslinking, to thereby reduce excessive condensation reaction.

The amount of the silanol-containing compound added can be properly adjusted depending on the expected physical properties of a cured product. The amount of the silanol-containing group is 0.1 to 50 parts by weight, preferably 0.3 to 20 parts by weight, still more preferably 0.5 to 10 parts by weight, per 100 parts by weight of the vinyl-based polymer (I). When the amount is below 0.1 parts by weight, the effect of the compound added may not appear, and on the contrary, when it exceeds 50 parts by weight, crosslinking may be insufficient, and strength or gel fraction of the cured product is extremely decreased.

The time to add the silanol-containing compound into the vinyl-based polymer (I) is not particularly limited, but it may be added in the production process of the vinyl-based polymer (I), or may be added in the preparation process of the curable composition.

<Thixotropic Agent (Antisagging Agent)>

If necessary, a thixotropic agent (antisagging agent) may be added to the curable composition of the present invention to prevent sagging and improve the workability.

By way of example, the antisagging agents include, but are not limited to, hydrogenated castor oil derivatives; metal soaps such as calcium stearate, aluminum stearate and barium stearate, and the like. These thixotropic agents (antisagging agents) may be used singly or two or more of them may be used in combination.

<Photocurable Substance>

If necessary, a photocurable substance may be added to the curable composition of the present invention. The photocurable substance is a substance whose molecular structure undergoes a chemical change in a short time by the action of light and which thus causes changes in physical properties such as curing. By adding such photocurable substance, it becomes possible to reduce the tackiness (residual tack) of the cured product surface after curing of the curable composition. This photocurable substance is a substance capable of curing upon irradiation with light. A typical photocurable substance is a substance capable of curing when allowed to stand at an indoor place in the sun (near a window) at room temperature for 1 day, for example. A large number of compounds of this type are known, including organic monomers, oligomers, resins, and compositions containing them, and they are not particularly limited in kind, and include, for example, unsaturated acrylic compounds, vinyl cinnamate polymers, azidated resins and the like.

The unsaturated acrylic compound is a monomer or oligomer having an unsaturated group represented by the general formula (30) below or a mixture thereof;

$$CH_2=CHR^{27}CO(O)— \quad (30)$$

(wherein $R^{27}$ represents hydrogen, an alkyl group having 1 to 10 carbon atoms, an aryl group having 6 to 10 carbon atoms, or an aralkyl group having 7 to 10 carbon atoms).

Specifically, the unsaturated acrylic compounds include (meth)acrylates of low-molecular-weight alcohols such as ethylene glycol, glycerol, trimethylolpropane, pentaerythritol and neopentyl alcohol; (meth)acrylates of alcohols derived from acids such as bisphenol A, acids such as isocyanuric acid or such low-molecular-weight alcohols as mentioned above by modification with ethylene oxide and/or propylene oxide; (meth)acrylate esters of hydroxyl-terminated polyether polyols whose main chain is a polyether, polymer polyols obtained by radical polymerization of a vinyl-based monomer(s) in a polyol whose main chain is a polyether, hydroxyl-terminated polyester polyols whose main chain is a polyester, and polyols whose main chain is a vinyl or (meth) acrylic polymer and which have hydroxyl groups in the main chain; epoxy acrylate oligomers obtained by reacting a bisphenol A-based, novolak type or other epoxy resin with (meth)acrylic acid; urethane acrylate type oligomers containing urethane bonds and (meth)acryl groups in the molecular chain as obtained by reacting a polyol, a polyisocyanate and a hydroxyl group-containing (meth)acrylate; and the like.

The vinyl cinnamate polymers are photosensitive resins whose cinnamoyl groups function as photosensitive groups, and include cinnamic acid-esterified polyvinyl alcohol species and various other polyvinyl cinnamate derivatives.

The azidated resins are known as photosensitive resins with the azido group serving as a photosensitive group and generally include photosensitive rubber solutions with an azide compound added as a photosensitizing agent, and detailed examples are found in "Kankosei Jushi (Photosensitive Resins)" (published on Mar. 17, 1972 by Insatsu Gakkai Shuppanbu, pages 93 ff, 106 ff, 117 ff). These can be used either singly or in admixture with a sensitizer added if necessary.

Among the photocurable substances mentioned above, unsaturated acrylic compounds are preferred in view of their easy handleability.

The photocurable substance is preferably added in an amount of 0.01 to 20 parts by weight per 100 parts by weight of the vinyl-based polymer (I). At addition levels below 0.01 parts by weight, the effects will be insignificant, and at levels exceeding 20 parts by weight, the physical properties may be adversely affected. The addition of a sensitizer such as a ketone or nitro compound or a promoter such as an amine can enhance the effects in some instances.

<Air Oxidation-Curable Substance>

An air oxidation-curable substance may be added if necessary to the curable composition of the present invention. The air oxidation-curable substance is a compound containing an unsaturated group capable of being crosslinked for curing by oxygen in the air. By adding such air oxidation-curable substance, it becomes possible to reduce the tack (also referred as residual tack) of the cured product surface on the occasion of curing of the curable composition. The air oxidation-curable substance in the present invention is a substance capable of curing upon contacting with air, and more specifically has a property of being cured as a result of reaction with oxygen in the air. A typical air oxidation-curable substance can be cured by allowing it to stand in the air in a room for 1 day, for example.

Specific examples of the air oxidation-curable substance include, for example, drying oils such as tung oil and linseed oil; various alkyd resins obtained by modification of such drying oils; drying oil-modified acrylic polymers, epoxy resins, and silicone resins; 1,2-polybutadiene, 1,4-polybutadiene, $C_5-C_8$ diene polymers and copolymers, and various modifications of such polymers and copolymers (e.g. maleinated modifications, boiled oil modifications); and the like. Among these, tung oil, liquid ones among the diene-based polymers (liquid diene-based polymers) and modifications thereof are particularly preferred.

Specific examples of the liquid diene-based polymers include, for example, liquid polymers obtained by polymerization or copolymerization of diene-based compounds such as butadiene, chloroprene, isoprene and 1,3-pentadiene, polymers such as NBR and SBR obtained by copolymerization of such diene-based compounds (as main components) with a monomer copolymerizable therewith such as acrylonitrile or styrene, and various modification thereof (e.g. maleinated modifications, boiled oil modifications, and the like). These may be used singly or two or more of them may be used in combination. Among these liquid diene-based compounds, liquid polybutadiene species are preferred.

The air oxidation-curable substances may be used singly or two or more of them may be used in combination. The use of a catalyst capable of promoting the oxidation curing or a metal drier in combination with the air oxidation-curable substance can enhance the effects in certain instances. Such catalysts or metal driers include, for example, metal salts such as cobalt naphthenate, lead naphthenate, zirconium naphthenate, cobalt octylate and zirconium octylate, amine compounds, and the like.

The air oxidation-curable substance is preferably added in an amount of 0.01 to 20 parts by weight per 100 parts by weight of the vinyl-based polymer (I). At levels below 0.01 parts by weight, the effects will be insignificant, and at levels exceeding 20 parts by weight, the physical properties may be adversely affected.

<Antioxidant>

An antioxidant may be added if necessary to the curable composition of the present invention. Various antioxidants are known and include, but are not limited to, those described, for example, in "Sankaboshizai Handbook (Handbook of Antioxidants)" published by Taiseisha LTD. and "Kobunshi Zairyo no Rekka to Anteika (Degradation and Stabilization of Polymer Materials)" (pp. 235-242) published by CMC Publishing CO., LTD.

Specific examples of the antioxidants include thioether-based antioxidants such as MARK PEP-36 and MARK AO-23 (both manufactured by Adeka Argus Chemical Co., Ltd.); and phosphorus-based antioxidants such as Irgafos 38, Irgafos 168, and Irgafos P-EPQ (all manufactured by Japan Ciba-Geigy). In particular, the hindered phenol compounds below are preferred.

Specific examples of the hindered phenol compounds include 2,6-di-tert-butyl-4-methylphenol, 2,6-di-tert-butyl-4-ethylphenol, mono(di or tri) (α-methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol-bis-[3-(3-tert-butyl-5-methyl-4-hydraxyphenyl)propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, pentaerythrityl-tetrakis[3-(3,5-di-tert-butyl-4-hydroxyphenyl)propionate], 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxy-hydrocinnamide), 3,5-di-tert-butyl-4-hydroxy-benzylphosphonate diethyl ester, 1,3,5-trimethyl-2,4,6-tris(3,5-di-tert-butyl-4-hydroxybenzyl)benzene, bis(3,5-di-tert-butyl-4-hydroxybenzylphosphonate ethyl)calcium, tris-(3,5-di-tert-butyl-4-hydroxybenzyl)isocyanurate, 2,4-2,4-bis[(octylthio)methyl]o-cresol, N,N'-bis[3-(3,5-di-tert-butyl-4-hydroxyphenyl)propionyl]hydrazine, tris(2,4-di-tert-butylphenyl)phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-tert-butyl-2-hydroxyphenyl)benzotriazole, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2-(3,5-di-tert-amyl-2-hydroxyphenyl)benzotriazole, 2-(2'-hydroxy-5'-tert-octylphenyl)-benzotriazole, methyl-3-[3-tert-butyl-5-(2H-benzotriazol-2-yl)-4-hydroxyphenyl]propionate-polyethylene glycol (molecular weight: about 300) condensates, hydroxyphenylbenzotriazole derivatives, 2-(3,5-di-tert-butyl-4-hydroxybenzyl)-2-n-butylmalonate bis(1,2,2,6,6-pentamethyl-4-piperidyl), and 2,4-di-tert-butylphenyl-3,5-di-tert-butyl-4-hydroxybenzoate.

Examples of commercial products include, but are not limited to, NOCRAC 200, NOCRAC M-17, NOCRAC SP, NOCRAC SP—N, NOCRAC NS-5, NOCRAC NS-6, NOCRAC NS-30, NOCRAC 300, NOCRAC NS-7, and NOCRAC DAH (all manufactured by Ouchi Shinko Chemical Industries Co.); MARK AO-30, MARK AO-40, MARK AO-50, MARK AO-60, MARK AO-616, MARK AO-635, MARK AO-658, MARK AO-80, MARK AO-15, MARK AO-18, MARK 328, and MARK AO-37 (all manufactured by Adeka Argus Chemical Co., Ltd.); IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, and IRGANOX-1425WL (all manufactured by Japan Ciba-Geigy); and Sumilizer GM and Sumilizer GA-80 (both manufactured by Sumitomo Chemical Co., Ltd.).

The antioxidant may be used in combination with a light stabilizer to be described later, and such combined use enhances the effects thereof and may improve the weather resistance and thus is particularly preferred. Such ready-made mixtures of an antioxidant and a light stabilizer as TINUVIN C353 and TINUVIN B75 (both are manufactured by Japan Ciba-Geigy) and the like may also be used.

The amount of the antioxidant added is preferably in the range of 0.1 to 10 parts by weight per 100 parts by weight of the vinyl-based polymer (I). At levels below 0.1 parts by weight, the weather resistance-improving effect is insignificant, while levels exceeding 10 parts by weight make no great difference in effect any longer and thus are economically disadvantageous.

<Light Stabilizer>

A light stabilizer may be added if necessary to the curable composition of the present invention. Various light stabilizers are known and include, but are not limited to, those described, for example, in "Sankaboshizai Handbook (Handbook of Antioxidants)" published by Taiseisha LTD. and "Kobunshi Zairyo no Rekka to Anteika (Degradation and Stabilization of Polymer Materials)" (pp. 235-242) published by CMC Chemical Publishing CO., LTD.

The light stabilizer used is not particularly limited, but ultraviolet absorbers are preferred among the light stabilizers. Specific examples thereof include, for example, benzotriazole compounds such as TINUVIN P, TINUVIN 234, TINUVIN 320, TINUVIN 326, TINUVIN 327, TINUVIN 329 and TINUVIN 213 (all are manufactured by Japan Ciba-Geigy), triazines such as TINUVIN 1577, benzophenones such as CHIMASSORB 81, benzoate compounds such as TINUVIN 120 (manufactured by Ciba Specialty Chemicals), and the like.

Additionally, hindered amine compounds are preferred, and such compounds include dimethyl succinate-1-(2-hydroxyethyl)-4-hydroxy-2,2,6,6-tetramethylpiperidine polycondensate, poly[{6-(1,1,3,3-tetramethylbutyl)amino-1,3,5-triazine-2,4-diyl} {(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, bis(2,2,6,6-tetramethyl-4-piperidyl)sebacate, bis(2,2,6,6-tetramethyl-4-piperidinyl)succinate and the like.

Examples of the relevant product names include, but are not limited to, TINUVIN 622LD, TINUVIN 144 and CHIMASSORB 944LD, CHIMASSORB 119FL, Irganofos 168 (all are manufactured by Japan Ciba-Geigy), MARK LA-52, MARK LA-57, MARK LA-62, MARK LA-67, MARK LA-63, MARK LA-68, MARK LA-82 and MARK LA-87 (all are manufactured by Adeka Argus Chemical Co., Ltd.), and Sanol LS-770, Sanol LS-765, Sanol LS-292, Sanol LS-2626, Sanol LS-1114, Sanol LS-744 and Sanol LS-440 (all are manufactured by Sankyo Co., Ltd.), and the like.

An ultraviolet absorber and a hindered amine compound may be used in combination, and the combined use may produce enhanced effects, and therefore both may be used in combination without any particular restriction, and the combined use is sometimes favorable.

The light stabilizer may be used in combination with the antioxidant, and such combined use enhances the effects thereof and may improve the weather resistance and is thus particularly preferred. Such ready-made mixtures of an antioxidant and a light stabilizer as TINUVIN C353 and TINUVIN B75 (both are manufactured by Japan Ciba-Geigy) and the like may also be used.

The amount of the light stabilizer added is preferably in the range of 0.1 to 10 parts by weight per 100 parts by weight of the vinyl-based polymer (I). At levels below 0.1 parts by weight, the weather resistance-improving effect is insignificant, while levels exceeding 10 parts by weight make no great difference in effect any longer and are thus economically disadvantageous.

<Release Agent>

If necessary, the curable composition of the present invention may further contain a release agent (metal soap).

The metal soap is not particularly limited but any arbitrary one can be used. The metal soap is generally one having a metal ion bound to a long-chain fatty acid, and any metal salt that has both a nonpolar or low-polarity segment derived from a fatty acid and a polar moiety, namely the moiety binding to a metal, within each molecule can be used.

The long-chain fatty acid include, for example, saturated fatty acids having 1 to 18 carbon atoms, unsaturated fatty acids having 3 to 18 carbon atoms, and aliphatic dicarboxylic acids. Among these, saturated fatty acids having 1 to 18 carbon atoms are preferred from the viewpoint of availability, and saturated fatty acids having 6 to 18 carbon atoms are particularly preferred from the viewpoint of mold release characteristics.

The metal ion includes alkali metals (lithium, sodium, potassium), alkaline earth metals (magnesium, calcium, barium), zinc, lead, cobalt, aluminum, manganese and strontium ions.

More specific examples of the metal soap include lithium stearate, lithium 12-hydroxystearate, lithium laurate, lithium oleate, lithium 2-ethylhexanoate, sodium stearate, sodium 12-hydroxystearate, sodium laurate, sodium oleate, sodium 2-ethylhexanoate, potassium stearate, potassium 12-hydroxystearate, potassium laurate, potassium oleate, potassium 2-ethylhexanoate, magnesium stearate, magnesium 12-hydroxystearate, magnesium laurate, magnesium oleate, magnesium 2-ethylhexanoate, calcium stearate, calcium 12-hydroxystearate, calcium laurate, calcium oleate, calcium 2-ethylhexanoate, barium stearate, barium 12-hydroxystearate, barium laurate, barium ricinoleate, zinc stearate, zinc 12-hydroxystearate, zinc laurate, zinc oleate, zinc 2-ethylhexanoate, lead stearate, lead 12-hydroxystearate, cobalt stearate, aluminum stearate and manganese oleate.

Among those metal soaps, stearic acid metal salts are preferred from the viewpoint of availability and safety, and one or more species selected from the group consisting of calcium stearate, magnesium stearate and zinc stearate are most preferred particularly from the economical point of view.

The amount of the metal soap added is not particularly limited, but it is generally preferable that the metal soap be used in an amount in the range of 0.025 to 5 parts by weight, more preferably 0.05 to 4 parts by weight, per 100 parts by weight of the vinyl-based polymer (I). When the amount of the metal soap compounded exceeds 5 parts by weight, the cured products tend to show deteriorated physical properties, and when the amount is lower than 0.025 parts by weight, there is a tendency toward failure to attain the desired mold release characteristics.

<Other Additives>

If necessary, various additives may be added to the curable composition of the present invention for the purpose of adjusting various physical properties of the curable composition or cured products. Such additives include, for example, flame retardants, antioxidants, radical scavengers, metal deactivators, antiozonants, phosphorus-containing peroxide decomposers, lubricants, pigments, blowing agents and the like.

These various additives may be used singly or two or more of them may be used in combination.

Specific examples of such additives are described in, for example, JP-B 4-69659, JP-B 7-108928, Japanese Patent Laying-Open No. 63-254149 and Japanese Patent Laying-Open No. 64-22904.

A method of preparing the curable composition of the present invention is not particularly limited, but the composition is preferably prepared as a two-component type formulation by forming the vinyl-based polymer (I) and other compounding ingredients into one pack to which the nucleophilic agent (II) is to be added at the time of curing, or as a one-component formulation to be cured by moisture in air after application, which is prepared by compounding and tightly sealing all the components/ingredients in a container for storage wherein the nucleophilic agent (II) used is a ketimine or imino compound to be hydrolyzed with moisture in air. In the case of such two-component type, a colorant or colorants can be added on the occasion of mixing of the two components. The colorant or colorants can be prepared by mixing and pasting, for example a pigment or pigments, with a plasticizer and/or a filler, as the case may be. By using the thus-prepared paste, it becomes possible to facilitate the working process. Furthermore, it is possible to finely adjust the curing rate on a working site by adding a retarder on the occasion of mixing up the two components.

<Curing Accelerator>

The Michael addition reaction of the amine compound with a polymerizable double bond will proceed easily even at ordinary temperatures, but in the case of the addition reaction thereof with an olefin not having an electron-withdrawing group, a catalyst may be used. As the reaction catalyst, a metal catalyst is useful. The metal catalyst includes copper(I) sulfate, copper(I) chloride, copper(II) chloride, copper(II) acetate, palladium(II) chloride, lithium(I) chloride silver oxide, osmium oxide, sodium, and the like. A catalyst for improving the activity of the amine component includes boron hydride metal salts, aluminum hydride metal salts, and the like.

<<Cured Product>>

The curable composition of the present invention has excellent curability at ordinary temperature (23° C.×55 R.H. %), and a cured product obtained by curing the curable composition is excellent in mechanical properties, oil resistance, heat resistance, and weather resistance. The present curable composition uses the amine component as a crosslinking agent, can thus be blended or crosslinked with an epoxy resin, and can improve the flexibility of a cured product of the epoxy resin and increase the strength of a cured product of the vinyl-based polymer without deteriorating compatibility therebetween.

<Uses>

Although not being particularly limited, the curable composition of the present invention is usable for various uses, for example sealants for construction and industries such as elastic sealants for building and construction, sealants for siding boards, sealants for pair glass, and sealants for vehicles; electric and electronic parts such as sealants for rear faces of solar cells; insulating materials such as insulating coating materials for electric wires and cables; pressure sensitive adhesives, adhesives, elastic adhesives, contact adhesives, adhesives for tiles, reactive hot melt adhesives, painting materials, powdery coating materials, coating materials, foams, seal materials for can covers etc., electric and electronic potting agents, films, gaskets, marine deck coatings, casting materials, various kinds of molding materials, artificial marble, rustproof and waterproof sealants for end faces (cut sections) of net glass or laminated glass, materials for vibration absorption/vibration suppression/noise reduction/seismic isolation used in an automobile, a ship, a household electrical appliance and the like, and liquid sealants used in automobile parts, electric parts, various kinds of machine parts, and the like.

The molded article showing rubber elasticity and obtained from the curable composition of the present invention can be used widely and mainly for gaskets and packing. For example, in an automobile field, it can be used for seal materials for keeping air-tightness, vibration-absorption materials for glass, vibration-absorption materials for vehicle body parts, and especially for window seal gaskets and gaskets for door glass. For chassis parts, it can be used as engine and suspension rubber for vibration absorption/noise reduction, particularly for engine mounting rubber. For engine parts, it can be used for hoses for cooling, fuel supply, exhaust control or the like, sealing materials for engine oil, and the like. Further, it can be used for parts of exhaust gas-cleaning apparatus and brake parts. In a household electrical appliance field, it can be used for packing, O-rings, belts and the like. More particularly, it can be used for ornaments for lighting and illuminating appliances, water-proof packing, vibration-absorption rubber and anti-insect packing, vibration absorption/noise reduction/air seal materials for cleaners, dripping covers, water-proof packing, heater packing, electrode part packing and safety valve diaphragms for electric water heating apparatus, hoses, water-proof packing and electromagnetic valves for sake-heating apparatus, water-proof packing, water supply tank-packing, water-absorbing valves, water-receiving packing, connection hose, belts, heat-insulating heater-packing, steam outlet-sealants and the like for steam oven microwave and jar-type rice cookers, oil packing, O-rings, drain packing, pressure tubes, air blow-tubes, air suction-/blow-packing, vibration-absorption rubber, oil supply port-packing, oil meter-packing, oil sending-pipes, diaphragm valves, gas tubes and the like for combustion apparatuses, speaker gaskets, speaker edge, turn table sheets, belts, pulleys and the like for acoustic appliances, and the like. In a building and construction field, it can be used for gaskets for structures (zipper gaskets), pneumatic-structure roofings, water-proof materials, shaped sealants, vibration-absorption materials, noise-reduction materials, setting blocks, slide member and the like. In a sporting field, it can be used for sport floor applications such as all-weather paving materials and gymnasium floor materials, sport shoesapplications such as shoe bottom materials and bottom inserts, applications as balls for ball games such as golf balls, and the like. In a field of vibration-absorption rubber, it can be used for vibration-absorption rubber for automobiles, vibration-absorption rubber for railway cars, vibration-absorption rubber for aircrafts, fenders and the like. In a marine and civil engineering field, it can be used for construction materials such as rubber expansive joints, journals, water-stopping plates, water-proof sheets, rubber dams, elastic paving materials, vibration-absorption pads, and protectors; for sub-materials for working such as rubber frames, rubber packers, rubber skirts, sponge mats, mortar hoses, and mortar strainers; for auxiliary materials for working such as rubber sheets and air hoses; for safety products such as rubber buoyant and wave-absorbing materials; for environment preservation products such as oil fences, silt fences, anti-pollution materials, marine hoses, dredging hoses, and oil skimmers; and the like. Further, it may be used as rubber plates, mats, foam plates and the like.

Especially, the curable composition of the present invention is particularly useful for sealing materials and adhesives and particularly useful for uses for which weather resistance and/or heat resistance are required and uses for which transparency is required. Since the curable composition of the present invention is excellent in weather resistance and adhesiveness, it can be used for adhesion work for outer wall tiles without work of embedding in jointing. Further, it is useful as an elastic adhesive for adhesion of a material having a different linear expansion coefficient or for a member that receives repetitive displacements by heat cycles, and/or as a coating material for making an under-layer material seen through due to its transparency, and/or as an adhesive for adhering transparent materials such as glass, polycarbonates and polyacrylic resins, and/or the like applications.

EXAMPLES

Although examples and comparative examples of the present invention will be described in the following, the present invention is not limited to these examples.

In the examples and comparative examples below, "parts" and "%" represent "parts by weight" and "% by weight", respectively. In the Examples, "triamine" refers to pentamethyldiethylene triamine.

In the examples below, "number-average molecular weight" and "molecular-weight distribution (ratio of the weight-average molecular weight to the number-average molecular weight)" were calculated by a standard polystyrene calibration method using gel permeation chromatography (GPC). In GPC measurement, polystyrene-crosslinked gel columns (Shodex GPC K-804; manufactured by Showa Denko K. K.) and chloroform were used as a GPC column and a GPC solvent, respectively.

Production Example 1

Synthesis of poly(n-butyl acrylate/ethyl acrylate/2-methoxyethyl acrylate) Having Acryloyl Groups at Both Termini 4.34 g (30.3 mmol) of copper(I) bromide and 74.3 mL acetonitrile were introduced into a 1-L flask and stirred under heating at 70° C. for 20 minutes in a nitrogen stream. 18.1 g (50.3 mmol) of diethyl 2,5-dibromoadipate, 216.6 mL (1.51 mol) of n-butyl acrylate, 301.2 mL (2.78 mol) of ethyl acrylate, and 225.4 mL (1.75 mol) of 2-methoxyethyl acrylate were added, and the mixture was stirred under heating at 80° C. for 20 minutes. 0.21 mL (1.00 mmol) of triamine was added to initiate the reaction. Additional triamine was added properly, and the mixture was stirred under heating at 80° C., and when the polymerization reaction rate exceeded 95%, the polymerization was finished. 300 g of this polymer was dissolved in N,N-dimethylacetamide (300 mL), and 7.4 g of potassium acrylate was added thereto, and the mixture was stirred under heating at 70° C. for 3 hours in a nitrogen atmosphere, to give a mixture of acryloyl group-terminated poly(butyl acrylate/ethyl acrylate/2-methoxyethyl acrylate) (polymer [1]). The N,N-dimethylacetamide in this mixture was distilled away under reduced pressure, and toluene was added to the residues, and insolubles were removed by filtration. The toluene in the filtrate was distilled away under reduced pressure, to purify the polymer [1]. The number-average molecular weight of the purified polymer [1] was 16200, the molecular-weight distribution was 1.12, and the average number of terminal acryloyl groups was 1.9.

Production Example 2

Synthesis of poly(n-butyl acrylate/ethyl acrylate/2-methoxyethyl acrylate) Having Acryloyl Groups at Both Termini 4.18 g (2.91 mmol) of cuprous bromide as a catalyst and 95.5 mL acetonitrile were charged and stirred under heating at 70° C. for 20 minutes in a nitrogen stream. 1.75 g (4.86 mmol) of diethyl 2,5-dibromoadipate, 278.5 mL (1.92 mol) of n-butyl acrylate, 387.2 mL (3.57 mol) of ethyl acrylate, 289.8 mL (2.25 mol) of 2-methoxyethyl acrylate were added thereto, and the mixture was stirred under heating at 80° C. for 20 minutes. 0.17 mL (0.85 mmol) of triamine was added to initiate the reaction. Additional triamine was added properly, and the mixture was stirred under heating at 80° C., and when the polymerization reaction rate exceeded 95%, the polymerization was finished.

400 g of this polymer was dissolved in N,N-dimethylacetamide (400 mL), and 10.7 g of potassium acrylate was added thereto, and the mixture was stirred under heating at 70° C. for 6 hours in a nitrogen atmosphere, to give a mixture of poly(n-butyl acrylate/ethyl acrylate/2-methoxyethyl acrylate) having acryloyloxy groups at both termini (hereinafter referred to as polymer [2]). The N,N-dimethylacetamide in this mixture was distilled away under reduced pressure, and toluene was added to the residues, and insolubles were removed by filtration. The toluene in the filtrate was distilled away under reduced pressure, to purify the polymer [2].

The number-average molecular weight of the purified polymer [2] having acryloyl groups at both termini was 21400, the molecular-weight distribution was 1.17, and the average number of terminal acryloyl groups was 1.8.

Production Example 3

Synthesis of an acryloyl group-terminated n-butyl acrylate polymer 3.36 g (23.5 mmol) of copper(I) bromide and 89.4 mL of acetonitrile were introduced into a 1-L flask and stirred under heating at 70° C. for 20 minutes in a nitrogen stream. 14.0 g (38.9 mmol) of diethyl 2,5-dibromoadipate and 894 mL (6.24 mmol) of n-butyl acrylate were added, and the mixture was stirred under heating at 80° C. for 20 minutes. 0.16 mL (0.77 mmol) of triamine was added to initiate the reaction. Additional triamine was added properly, and the mixture was stirred under heating at 80° C., and when the polymerization reaction rate exceeded 95%, the polymerization was finished.

400 g of this polymer was dissolved in N,N-dimethylacetamide (400 mL), and 7.4 g of potassium acrylate was added thereto, and the mixture was stirred under heating at 70° C. for 3 hours in a nitrogen atmosphere, to give an acryloyl group-terminated n-butyl acrylate polymer ([3]) mixture. The N,N-dimethylacetamide in this mixture was distilled away under reduced pressure, and toluene was added to the residues, and insolubles were removed by filtration. The toluene in the filtrate was distilled away under reduced pressure, to purify the polymer [3]. The number-average molecular weight of the purified polymer [3] was 22500, the molecular-weight distribution was 1.25, and the average number of terminal acryloyl groups was 1.9.

<Methods of Evaluating Physical Properties>

Physical properties of cured products (test specimens) prepared in Examples and Comparative Examples were measured according to the following methods and conditions.
(Gel Fraction)

The sheet-like cured product (test specimen) obtained above was dipped in toluene for 24 hours, then removed and dried at 80° C. for 3 hours, and the change in the weight of the test specimen before and after the test was calculated as follows:

Gel fraction (%)=(weight of the test specimen after dipping in toluene and drying)/(weight of the test specimen before the test)×100

As the gel fraction becomes nearer to 100, the degree of curing is indicated to be higher.
(Mechanical Properties)

A (⅓)-size dumbbell test specimen was cut out from the sheet-like cured product and measured at a pulling rate of 200 mm/minute at 23° C. under 50% $R^H$ (measuring instrument: an autograph manufactured by Shimadzu Corporation) according to JIS K 6251. In Table 1, M50 (unit: MPa) indicates the modulus of the dumbbell test specimen upon 50% elongation, M100 (unit: MPa) indicates the modulus of the dumbbell upon 100% elongation, Tb (unit: MPa) indicates the strength of the dumbbell at break, and Eb (unit: %) indicates the elongation of the dumbbell at break.
(Duro a Hardness)

Measured under 23° C.×55% RH conditions (measuring instrument: CL-150 (CONSTANT DOADER DUROMETER) manufactured by ASKER and DUROMETER A manufactured by Shimadzu Corporation) according to JIS K 6253.
(Bending Resistance)

A test specimen of 40 mm×10 mm×2 mm in size was cut out from the sheet-like cured product, and this test specimen was wound around a glass bar (glass bar of φ7 mm in diameter), and 1 minute later, the state of the test specimen was observed. The evaluation criteria are as follows:
A: not cracked.
B: the sheet was broken.
(Heat Resistance Test)

The cured product of 10 mm×10 mm in size was left standing at 150° C., and 1 day later, the state of the cured product was observed. The evaluation criteria are as follows:
A: not changed.
B: liquefied.

Example 1

100 parts of the vinyl-based polymer (I), that is, the polymer [1] obtained in Production Example 1, 1 part of a phenol-based antioxidant tetrakis-[methylene-3-(3,5-di-tert-butyl-4-hydroxyphenyl)propionate]methane (trade name: IRGANOX 1010, manufactured by Ciba Specialty Chemicals), and 1.75 parts of an amine compound triethylene tetramine were added to a 200-cc polypropylene cup, then sufficiently mixed, poured into a mold form, and cured under 55% RH at 23° C. for 7 days to give a cured product sheet of 2 mm in thickness.

Example 2

50 parts of the vinyl-based polymer (I), that is, the polymer [1] obtained in Production Example 1, 50 parts of EPIKOTE 828 (bisphenol A epoxy resin, manufactured by Japan Epoxy Resin Co., Ltd.), 1 part of an antioxidant IRGANOX 1010, and 41.8 parts of an amine compound Adeka Grand Amide 645 (polyamidoamine compound, manufactured by Asahi Denka Co., Ltd.) were added to a 200-cc polypropylene cup, then sufficiently mixed, poured into a mold form, and cured under 55% RH at 23° C. for 7 days to give a cured product sheet of 2 mm in thickness.

Example 3

A cured product sheet was prepared in the same manner as in Example 2 except that 50 parts of EPOLIGHT 4000 (hydrogenated bisphenol A epoxy resin, manufactured by Kyoeisha Chemical Co., Ltd.) and 34.5 parts of Adeka Grand Amide 645 were added in place of EPIKOTE 828 in Example 2.

Example 4

A cured product was prepared in the same manner as in Example 2 except that 50 parts of EPIKOTE 191P (glycidyl ester epoxy resin, manufactured by Japan Epoxy Resin Co., Ltd.) and 46.3 parts of Adeka Grand Amide 645 were added in place of EPIKOTE 828 in Example 2.

Example 5

100 parts of the vinyl-based polymer (I), that is, the polymer [1] obtained in Production Example 1, 1 part of a phenol-based antioxidant tetrakis-[methylene-3-(3,5-di-tert-butyl-4-hydroxyphenyl)propionate]methane (trade name: IRGANOX 1010, manufactured by Ciba Specialty Chemicals), 1.63 parts of a polythiol compound (trade name: Epicure QX40, manufactured by Asahi Denka Co., Ltd.), and 0.5 part of a curing catalyst N,N,N,N-tetramethyl-1,6-hexane diamine were added to a 200-cc polypropylene cup, then sufficiently mixed, poured into a mold form, and cured under 55% RH at 23° C. for 7 days to give a cured product sheet of 2 mm in thickness.

Example 6

100 parts of the vinyl-based polymer (I), that is, the polymer [2] obtained in Production Example 2, 1 part of a phenol-based antioxidant tetrakis-[methylene-3-(3,5-di-tert-butyl-4-hydroxyphenyl)propionate]methane (trade name: IRGANOX 1010, manufactured by Ciba Specialty Chemicals), 1.25 parts of a polythiol compound (trade name: Epicure QX40, manufactured by Asahi Denka Co., Ltd.), and 0.5 part of a curing catalyst N,N,N,N-tetramethyl-1,6-hexane diamine were added to a 200-cc polypropylene cup, then sufficiently mixed, poured into a mold form, and cured under 55% RH at 23° C. for 7 days to give a cured product sheet of 2 mm in thickness.

Example 7

100 parts of the vinyl-based polymer (I), that is, the polymer [3] obtained in Production Example 3, 1 part of a phenol-based antioxidant tetrakis-[methylene-3-(3,5-di-tert-butyl-4-hydroxyphenyl)propionate]methane (trade name: IRGANOX 1010, manufactured by Ciba Specialty Chemicals), 1.20 parts of a polythiol compound (trade name: Epicure QX40, manufactured by Asahi Denka Co., Ltd.), and 0.5 part of a curing catalyst N,N,N,N-tetramethyl-1,6-hexane diamine were added to a 200-cc polypropylene cup, then sufficiently mixed, poured into a mold form, and cured under 55% RH at 23° C. for 7 days to give a cured product sheet of 2 mm in thickness.

Example 8

100 parts of the vinyl-based polymer (I), that is, the polymer [2] obtained in Production Example 2, 1 part of a phenol-based antioxidant tetrakis-[methylene-3-(3,5-di-tert-butyl-4-hydroxyphenyl)propionate]methane (trade name: IRGANOX 1010, manufactured by Ciba Specialty Chemicals), 1.63 parts of a polythiol compound (trade name: Epicure QX40, manufactured by Asahi Denka Co., Ltd.), and 2.25 parts of a photoradical initiator benzophenone were added to a 200-cc polypropylene cup, then sufficiently mixed, poured into a mold form, and cured by irradiation with an UV irradiation device (Igrandage ECS-301, manufactured by Igraphic Ltd.; lamp energy=80 W/cm, irradiation distance=15 cm, accumulated light quantity=18900 mJ/cm$^2$), to give a cured product sheet of 2 mm in thickness.

Comparative Example 1

100 parts of EPIKOTE 828, 1 part of IRGANOX 1010, and 81.7 parts of Adeka Grand Amide 645 were well mixed with one another, poured into a mold form, and cured under 55% RH at 23° C. for 7 days to give a cured product sheet of 2 mm in thickness.

Comparative Example 2

100 parts of EPOLIGHT 4000, 1 part of IRGANOX 1010, and 81.7 parts 67.1 parts of Adeka Grand Amide 645 were well mixed with one another, poured into a mold form, and cured under 55% RH at 23° C. for 7 days to give a cured product sheet of 2 mm in thickness.

Comparative Example 3

100 parts of EPIKOTE 191P, 1 part of IRGANOX 1010, and 93.0 parts of Adeka Grand Amide 645 were well mixed with one another, poured into a mold form, and cured under 55% RH at 23° C. for 7 days to give a cured product sheet of 2 mm in thickness.

The cured product sheets obtained above were measured for their gel fraction, mechanical properties, Duro A hardness and bending resistance by the above methods of evaluating physical properties. The results are shown in Table 1.

Reference Example 100 parts of the vinyl-based polymer (I), that is, the polymer [1] obtained in Production Example 1, 1 part of IRGANOX 1010, 0.2 part of a photoradical initiator 2-hydroxy-2-methyl-1-phenyl-propan-1-one (DAROCURE 1173, manufactured by Ciba Specialty Chemicals) and 0.1 part of a photoradical initiator bis(2,4,6-trimethylbenzoyl)-phenylphosphine oxide (IRGACURE 819, manufactured by Ciba Specialty Chemicals) were added, sufficiently mixed, poured into a mold form, and cured by irradiation with an UV irradiation device (ECS-301GX, manufactured by Igraphic Ltd.; irradiation condition 80 W/cm, irradiation distance 15 cm) for 30 seconds to give a cured product sheet of 2 mm in thickness.

The cured product sheet obtained above was measured for its gel fraction, mechanical properties, Duro A hardness, bending resistance and heat resistance by the above methods of evaluating physical properties. The results are shown in Table 1.

TABLE 1

| Evaluated Physical Property Items | | Examples | | | | | | | | Comparative Examples | | | Reference Example |
|---|---|---|---|---|---|---|---|---|---|---|---|---|---|
| | | 1 | 2 | 3 | 4 | 5 | 6 | 7 | 8 | 1 | 2 | 3 | |
| Gel fraction (%) | | 97.1 | 85.1 | — | 78.9 | 92.0 | 93.8 | 85.7 | 86.2 | 100 | 100 | 100 | 99 |
| Mechanical properties (tensile characteristics) (⅓-size dumbbell) | M50 (Mpa) | — | 1.22 | 0.92 | 0.86 | — | — | — | 0.14 | The sheet was so rigid that when a dumbell was punched out, the sample was broken. | | | 0.37 |
| | M100 (Mpa) | 0.12 | — | — | — | 0.25 | 0.21 | 0.15 | 0.24 | | | | 0.65 |
| | Tb (Mpa) | 0.89 | 1.33 | 1.44 | 1.08 | 0.53 | 0.54 | 0.48 | 0.28 | | | | 0.65 |
| | Eb (%) | 550 | 65 | 70 | 83 | 233 | 321 | 383 | 126 | | | | 100 |
| Hardness (Duro A) | | 1 | 44 | 25 | 32 | 11 | 8 | 3 | 10 | 85 | 93 | 89 | 27 |
| Bending resistance | | A | A | A | A | A | A | A | A | B | B | B | A |
| Heat resistance (150° C. for 1 day) | | — | — | — | — | A | A | A | A | — | — | — | A |

As shown in Table 1, the Michael addition cured products using the polyamine component can be characterized as follows: It can be seen that the cured product in Example 1 where the vinyl-based polymer (I) was cured as the resin component attains curability, mechanical properties, rubber characteristic (low hardness) and flexibility superior to those of the photoradical cured product of the vinyl-based polymer (I) in the Reference Example. It can be seen that in Examples 2 to 4 where the epoxy resin was further added, strength is improved in addition to excellent hardness, rubber characteristic, and flexibility. In addition, the Michael addition products cured at ordinary temperature in Examples 4 to 7 where the vinyl-based polymer (I) and the polythiol component were used, and the photocured product in Example 8, also attain excellent curability, mechanical properties, rubber characteristic (low hardness) and flexibility and further have excellent heat resistance. It can be seen that in Comparative Examples 1 to 3, dumbbell test specimens for measurement of mechanical properties cannot be punched out, and the cured products are broken in the bending resistance test, thus failing to show flexibility, but in the Examples, excellent elongation, flexibility and low hardness can be realized. From these results, it can be said that the curable composition of the invention and its cured product have excellent curability and mechanical properties even when the vinyl-based polymer is used alone in the composition or when a vinyl-based polymer/epoxy resin blend is used in the composition.

INDUSTRIAL APPLICABILITY

The curable composition of the present invention has excellent oil resistance, heat resistance and weather resistance and can give cured products having excellent curability at ordinary temperature and mechanical properties. Specifically, it is estimated that a rubber-like cured product obtained by curing the curable composition of the present invention can be applied by itself to various uses requiring the above-mentioned rubber characteristic, oil resistance, heat resistance and weather resistance and is also useful for modification of resins such as epoxy resin.

The invention claimed is:

1. A curable composition comprising a vinyl-based polymer (I) having one or more crosslinkable functional groups at a terminus on average, a nucleophilic agent (II) and an epoxy resin (III), wherein
the molecular-weight distribution of said vinyl-based polymer (I) is less than 1.8,
the crosslinkable functional group of said vinyl-based polymer (I) is a group having a polymerizable carbon-carbon double bond,
said vinyl-based polymer (I) is a polymer produced by living radical polymerization, and said vinyl-based polymer (I) comprises a main chain formed from at least one vinyl-based monomer selected from the group consisting of
(meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl (meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl(meth)acrylate, stearyl(meth)acrylate, glycidyl(meth)acrylate, γ-(methacryloyloxypropyl)trimethoxysilane, an ethylene oxide adduct of (meth)acrylic acid, trifluoromethylmethyl (meth)acrylate, 2-trifluoromethylethyl(meth)acrylate, perfluoroethylmethyl(meth)acrylate, 2-perfluoroethylethyl(meth)acrylate, perfluoroethylperfluorobutylmethyl(meth)acrylate, 2-perfluoroethyl-2-perfluorobutylethyl(meth)acrylate, perfluoroethyl(meth)acrylate, perfluoromethyl(meth)acrylate, diperfluoromethylmethyl(meth)acrylate, 2,2-diperfluoromethylethyl(meth)acrylate, perfluoromethylperfluaroethylmethyl(meth)acrylate, 2-perfluoromethyl-2-perfluaroethylethyl (meth)acrylate, 2-perfluorohexylmethyl(meth)acrylate, 2-perfluorohexylethyl(meth)acrylate, 2-perfluorodecylmethyl(meth)acrylate, 2-perfluorodecylethyl(meth)acrylate, 2-perfluorohexadecylmethyl(meth)acrylate and 2-perfluorohexadecylethyl(meth)acrylate.

2. The curable composition according to claim 1, wherein the nucleophilic agent (II) is a compound having active hydrogen.

3. The curable composition according to claim 2, wherein said compound having active hydrogen is an amine compound and/or a thiol compound.

4. The curable composition according to claim 3, wherein said amine compound is at least one member selected from the group consisting of an aliphatic polyamine, an aromatic polyamine, an alicyclic polyamine, a polyamidoamine, and an imidazole.

5. The curable composition according to claim 3, wherein said thiol compound is at least one member selected from the group consisting of an aliphatic polythiol, an aromatic polythiol and a modified polythiol.

6. The curable composition according to claim 1, wherein the crosslinkable functional group of said vinyl-based polymer (I) is an alkenyl group.

7. The curable composition according to claim 1, wherein the main chain of said vinyl-based polymer (I) is a (meth)acrylic polymer.

8. The curable composition according to claim 1, wherein the main chain of said vinyl-based polymer (I) is an acrylic polymer.

9. The curable composition according to claim 1, wherein the main chain of said vinyl-based polymer (I) is an acrylate polymer.

10. The curable composition according to claim 1, wherein the living radical polymerization is atom transfer radical polymerization.

11. The curable composition according to claim 10, wherein the atom transfer radical polymerization uses, as a catalyst, a metal complex selected from transition metal complexes composed of a VII, VIII, IX, X, or XI group element in the periodic table as a central metal.

12. The curable composition according to claim 11, wherein the metal complex used as a catalyst is a complex selected from the group consisting of complexes of copper, nickel, ruthenium, or iron.

13. The curable composition according to claim 12, wherein the metal complex used as a catalyst is a complex of copper.

14. A cured product obtained by curing the curable composition according to claim 1.

* * * * *